United States Patent
Omura et al.

(10) Patent No.: US 6,915,702 B2
(45) Date of Patent: Jul. 12, 2005

(54) PIEZORESISTIVE TRANSDUCERS

(75) Inventors: Yoshiteru Omura, Seto (JP); Kentaro Mizuno, Nisshin (JP); Kouji Tsukada, Seto (JP); Jiro Sakata, Nagoya (JP); Norio Fujitsuka, Nisshin (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/300,617

(22) Filed: Nov. 21, 2002

(65) Prior Publication Data

US 2003/0101828 A1 Jun. 5, 2003

(30) Foreign Application Priority Data

Nov. 22, 2001 (JP) .......................................... 2001-357500
Feb. 7, 2002 (JP) .......................................... 2002-031068
Sep. 4, 2002 (JP) .......................................... 2002-259220

(51) Int. Cl.$^7$ ............................................... G01B 7/16
(52) U.S. Cl. ......................................................... 73/777
(58) Field of Search .......................... 73/777, 720, 721, 73/726, 727

(56) References Cited

U.S. PATENT DOCUMENTS

| | | | | |
|---|---|---|---|---|
| 4,680,606 A | * | 7/1987 | Knutti et al. | 73/862.046 |
| 4,771,638 A | * | 9/1988 | Sugiyama et al. | 73/721 |
| 4,833,929 A | * | 5/1989 | Omura et al. | 73/862.68 |
| 5,144,843 A | * | 9/1992 | Tamura et al. | 73/727 |
| 5,341,688 A | * | 8/1994 | Morikawa et al. | 73/777 |
| 5,773,728 A | | 6/1998 | Tsukada et al. | |
| 6,631,646 B1 | * | 10/2003 | Maitland | 73/777 |

FOREIGN PATENT DOCUMENTS

JP          8-271363        10/1996

* cited by examiner

*Primary Examiner*—Edward Lefkowitz
*Assistant Examiner*—Takisha Miller
(74) *Attorney, Agent, or Firm*—Oblon, Spivak, McClelland, Maier & Neustadt, P.C.

(57) ABSTRACT

Force detection devices may have high detection precision and may prevent current leakage through a strain gage 126 to the outside. For example, a force detection block 120 may include a semiconductor substrate 122, a first insulating layer 124 and a semiconductor layer 126 (strain gage). The strain gage 126 preferably includes a site where resistance changes in accordance with the stress acting thereon. The strain gage 126 preferably constitutes at least a portion of a ridge 130 projects from the surface of the force detection block 120. A force transmission block 138 may be attached to a top surface of the ridge 130. The width of the first insulating layer 124 is preferably greater than the width of the semiconductor layer 126.

10 Claims, 20 Drawing Sheets

PIEZORESISTIVE TRANSDUCERS

CROSS-REFERENCE

This application claims priority to Japanese patent application serial numbers 2001-357500, 2002-031068, 2002-259220, the contents of which are hereby incorporated by reference as if fully set forth herein.

BACKGROUND OF THE INVENTION

1. Field of the Invention

The invention relates to force detection devices, e.g., piezoresistive transducers, and methods for manufacturing the same. Such devices can detect the magnitude of a force applied to the device. The force may be applied to the device by the pressure surrounding the device or may be transmitted to the device by force transmitting mechanical members.

2. Description of the Related Art

U.S. Pat. No. 5,773,728 discloses related force detection devices (i.e., piezoresistive transducers). These force detection devices comprise semiconductor material (e.g., a strain gage) that changes electrical resistance in response to stress or strain applied to the semiconductor material. Generally speaking, a strain generated within the semiconductor material is proportional to a stress applied to the material, and the stress is proportional to a force applied to the material. Therefore, the magnitude of the force applied to the device can be measured by detecting the electric resistance of the semiconductor material.

SUMMARY OF THE INVENTION

It is one object of the present teachings to provide improved force detecting devices and methods for manufacturing the same.

For example, the known force detecting devices suffer from current leakage from the strain gage. As a result of research conducted by the present inventors, the current leakage appears to be caused by insufficient application of an insulating layer around the strain gage. The present teachings provide techniques for overcoming the current leakage problem, thereby increasing the detection precision of the present force detecting devices. The present teachings further provide techniques for making changes in electric resistance of the strain gage in response to changes in the force greater then the known devices. This technique provides higher sensitivity. In addition, the present teachings provide techniques for reducing fluctuations in the magnitudes of the electrical resistance changes within the strain gages caused by the force being applied to a plurality of force detection devices.

Thus, in one aspect of the present teachings, force detection devices have relatively high force detection accuracy and suppresses current leakage from a strain gage. In another aspect of the present teachings, force detection device having high detection sensitivity include strain gages that exhibit relatively large magnitude changes in electric resistance in response to changes in the force applied to the strain gage. In another aspect of the present teachings, fluctuations in the magnitude of electric resistance changes of the strain gages can be reduced when a plurality of force detection devices is utilized.

In one embodiment of the present teachings, the width of a first insulating layer between a semiconductor substrate and a strain gage is preferably greater than the width of the strain gage. In another embodiment of the present teachings, the strain gage may be formed partially within a ridge. The position of the strain gage within the ridge may be experimentally optimized for each particular application in accordance of the present teachings.

In another embodiment of the present teachings, force detection devices may include a force detection block having a ridge formed on a top surface of the force detection block. A strain gage may be formed within the ridge. The first insulating layer may be disposed between a semiconductor substrate and the strain gage and the width of the first insulating layer is preferably greater than the width of the strain gage. A second insulating layer may cover a top surface of the semiconductor substrate and/or the strain gage. The strain gage preferably comprises a material (e.g., a piezoresistive material) whose electrical resistance changes in response to strain or stress applied to the material. The strain gage may be formed at least partially within the ridge.

In another embodiment, the width of the first insulating layer may preferably be greater than the width of the strain gage at least on one side of the strain gage. The width of the first insulating layer may more preferably be greater than the width of the strain gage on both sides of the strain gage.

Such embodiments are capable of suppressing or substantially preventing current leakage from the strain gage to the outside of the strain gage. That is, if the width of the first insulating layer is greater than the width of the strain gage, the first insulating layer prevents a short circuit between the strain gage and other circuit elements. Thus, current is prevented from leaking from the strain gage by the first insulating layer.

In another embodiment of the present teachings, a force transmission block preferably contacts a top surface of the ridge of the force detection block. The force transmission block preferably smoothes or averages the stress distribution within the ridge.

In another embodiment, the force detection block may include a semiconductor substrate having a two-stepped ridge on a top surface of the semiconductor substrate. A lower ridge may serve as a base for supporting an upper ridge and the lower ridge is preferably wider than the upper ridge. The strain gage may be formed within the upper, narrower ridge. The lower, wider base may be integral with the semiconductor substrate. The first insulating layer may cover a top surface of the lower, wider base of the semiconductor substrate. The first insulating layer may be disposed between the semiconductor substrate (base) and the strain gage (ridge) and may be wider than the strain gage. The two-stepped ridge (ridge on base structure) preferably prevents the force detection block from contacting the force transmission block at a position other than along the ridge. The two-stepped ridge also preferably increases the range of forces that can be measured by the device.

In another embodiment, the first insulating layer preferably covers at least a portion of the main surface of the force detection block. The second insulating layer may cover the portion of the ridge in which the strain gage is formed. In this case, the second insulating layer preferably comprises a heat oxidized silicon film. The second insulating layer also may cover the ridge and at least a portion of the main surface of the force detection block. According to these designs, electric current flowing through the strain gage is effectively prevented from leaking to the outside (e.g., to a force transmission block). Furthermore, current leakage can be more effectively suppressed if the second insulating layer comprises a heat oxidized silicon film.

The force detection block preferably may be formed from a commercially available "silicon on insulator substrate (SOI)." The substrate of the force detection block or the second semiconductor layer may be formed from the SOI substrate. The first insulating layer may be formed from an insulating layer within the SOI substrate. The strain gage or the first semiconductor layer may be formed from an active silicon layer of the SOI substrate. The force detection block may be formed with a layered construction that includes the substrate, the first insulating layer, and the strain gage, by using the SOI substrate. These designs also effectively prevent current flowing through the strain gage from leaking to the outside.

As noted above, a force transmission block may contact the top surface of the ridge of the force detection block. In another embodiment, the lower surface of the force transmission block may project downwardly at a position that will contact the force detection block. Further, the lower surface of the force transmission block may include a recess that prevents contact with the force detection block at portions other than the ridge. In this case, even if the force transmission block bends due to a large external force applied to the force transmission block, the force transmission block is prevented from contacting the force detection block, thereby increasing the measurement range of the force detecting device.

In another aspect of the present teachings, it is noted that the stress distribution within the ridge was assumed to be uniform. The magnitude of the resistance change is detected based on the averaged resistance within the strain gage. However, if some portions within the strain gage receive less stress, the magnitude of the averaged resistance change within the strain gage will be reduced. On the other hand, if the strain gage is formed at a position where a relatively large stress change occurs, the magnitude of the averaged resistance change within the strain gage will be increased, and the measuring sensitivity will be increased. However, as a result of research conducted by the inventions, it was discovered that the stress distribution within the ridge caused by the application of the force to the ridge is not uniform. In fact, some portions within the ridge receive larger stress, and other portions receive smaller stress. Based upon this discovery, a variety of embodiments have been developed to further improve the performance of the force detection devices.

Thus, in another embodiment of the present teachings, force detection devices may include one or more strain gages formed within a portion of the ridge that receives a larger stress than the rest of the ridge. In this case, the averaged stress change within the strain gage will be larger than the averaged stress change within the ridge. Therefore, the averaged resistance change within the strain gage will be larger than the averaged resistance change within the ridge and increased measuring sensitivity can be obtained without reducing the contact area of the force detection block and force transmission block. Generally speaking, although a small contact area provides greater measuring sensitivity, the mechanical strength of the device is weakened. However, the present teachings provide increased measuring sensitivity as well as increased mechanical strength.

In another embodiment, the strain gage is formed within an area where the stress is relatively uniformly distributed. Although some portions within the ridge have a sharply changing stress distribution, the other portions within the ridge exhibit little changing stress distribution. Preferably, the strain gage is provided within the portion of the ridge in which the difference between the maximum stress and minimum stress within the area is less than 20% of the difference between the maximum stress and minimum stress within the ridge. More preferably, the strain gage may be provided within the portion of the ridge in which the stress difference is less than 10% of the stress difference within the ridge.

The inventors have discovered that although the distribution of stress, which is generated by application of a force to the force transmission block, is not uniform, an area exists in which the stress distribution is generally flat locally. Thus, the above-noted embodiment, which is based on this discovery, substantially reduces fluctuations in the magnitude of electric resistance changes of the strain gages among a plurality of force detection devices.

In another embodiment, the strain gage may be locally formed along a centerline of the ridge. In the alternative, the strain gage may be formed along one of side faces of the ridge or along both side faces of the ridge. The inventors have discovered that the portion along the side faces of the ridge receives relatively larger stress and the portion along the centerline of the ridge receives relatively smaller stress when the force transmission block is wider than the ridge. This result may be due to the fact that the force applied to the force transmission block at a region other than the ridge contact region may be primarily received along the outer side faces of the ridge.

If the strain gage is locally formed along one of the side faces of the ridge or along both side faces of the ridge, the averaged stress change and averaged resistance change within the strain gage will be larger than the averaged stress change and averaged resistance change within the ridge. Therefore, increased measuring sensitivity can be obtained without reducing the contact area of the force detection block and force transmission block.

If the strain gage is locally formed along the centerline of the ridge, the averaged stress change and averaged resistance change within the strain gage will be smaller than the averaged stress change and averaged resistance change within the ridge. This feature leads to low fluctuations of detection sensitivities among a plurality of force detection devices.

In another embodiment, the strain gage may be formed from a material that changes electric resistance in accordance with the strain or stress (e.g., a piezoresistive material) and the strain gage may locally formed at a middle or bottom portion of the ridge in the height direction of the ridge. The inventors have discovered that when the force transmission block does not simply contact the force detection block but also is attached thereto, the stress generated within the ridge resulting from the application of a force to the force transmission block will be larger or greater at the middle or bottom portion in the height direction of ridge than the stress at the top surface of ridge. Thus, based on this discovery, force detection devices having a larger magnitude of resistance change of the strain gage, and high detection sensitivity can be realized.

According to the various above-noted embodiments, the ridge may preferably be relatively long and narrow and a plurality of ridges may preferably be formed in the force detection device. Herein, a "long and narrow" ridge may preferably have a length to width ratio when viewed in plan view of at least 4:1 and more preferably at least 8:1. The long and narrow ridge may be bent or curved in a plan view. Such configuration provides a small contact area between the force detection block and force transmission block, which will provide high detection sensitivity. In addition, the force transmission block can be supported in a stable manner by the plurality of ridges or a bent or curved ridge.

In the force detection devices of the above embodiments, one or more ridges are preferably formed on the (110) surface of the force detection block. A ridge or ridges formed on the (110) surface generates a larger magnitude of resistance change in the strain gage than the ridge formed on another crystal surface. In other words, higher sensitivity is realized. In the alternative, one or more ridges may be formed on the (100) surface of the force detection block. A ridge or ridges on the (100) surface realizes relatively high sensitivity to a certain extent and allows simple integration of the device into a small area.

DETAILED DESCRIPTION OF THE PREFERRED EMBODIMENTS

First Representative Embodiment

Figure 1:
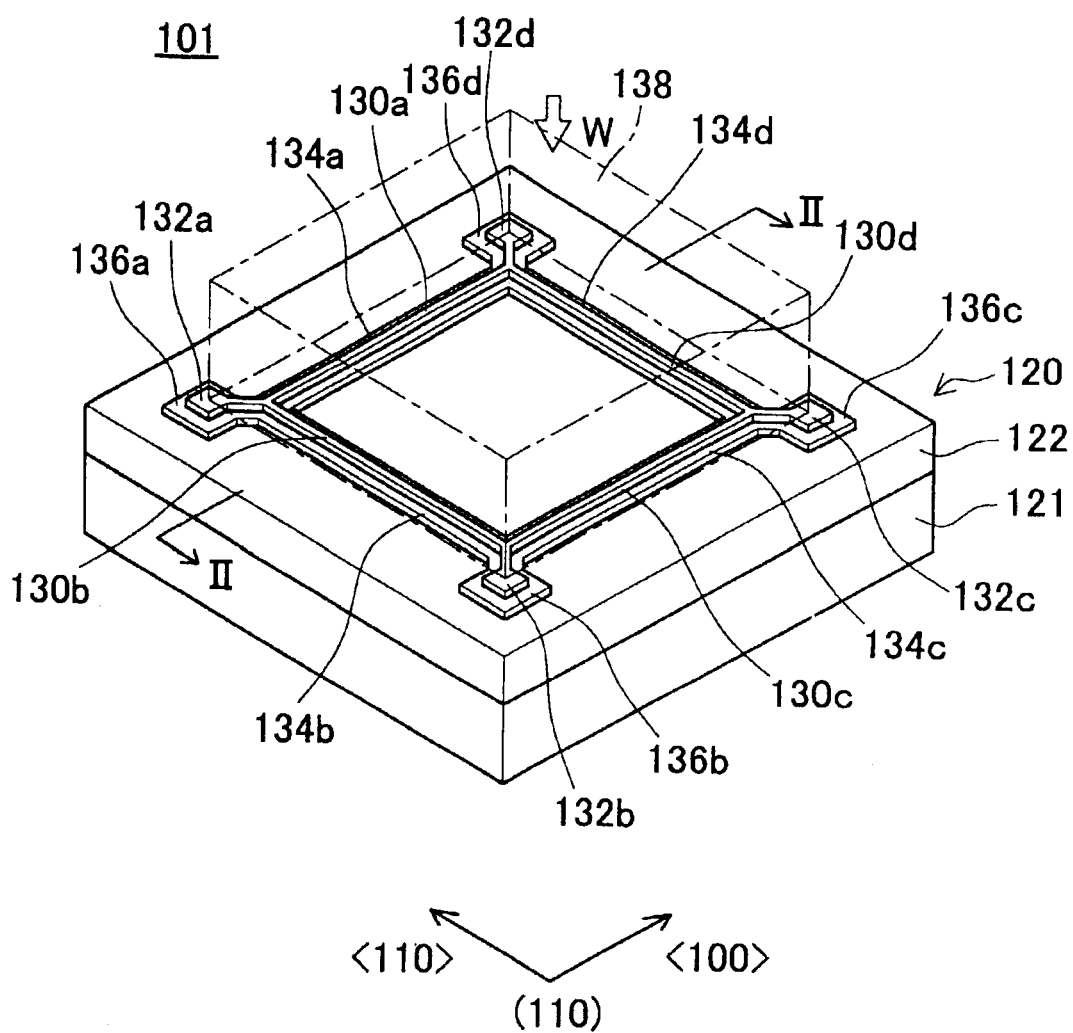
FIG. 1 is a perspective view of a first representative force detection device.
Figure 2:
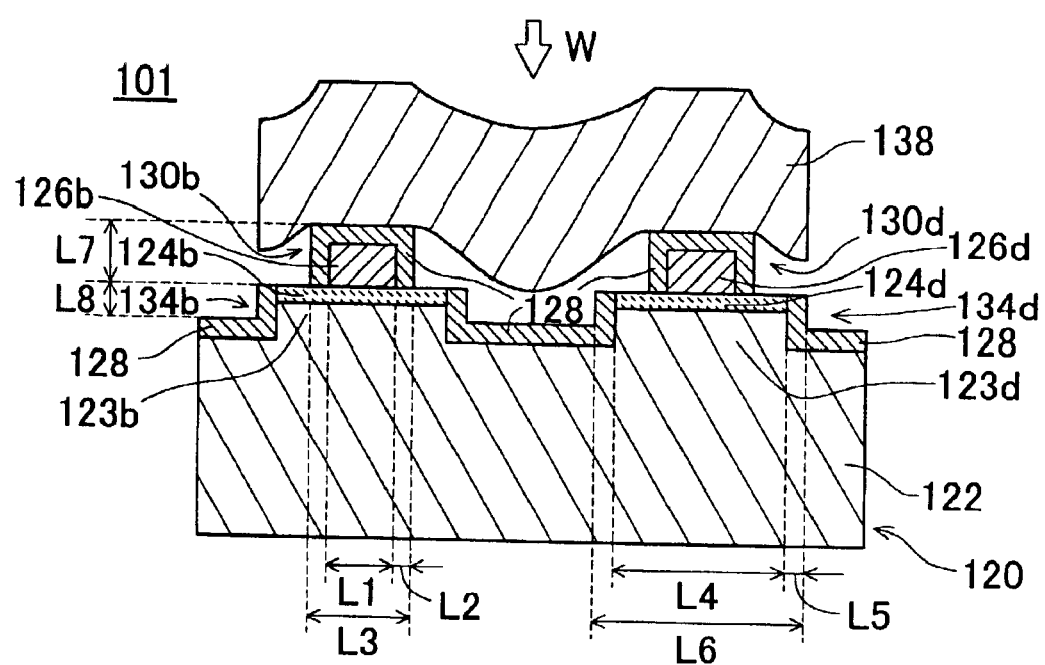
FIG. 2 is a cross sectional view taken along line II—II shown in FIG. 1.
Figure 3:
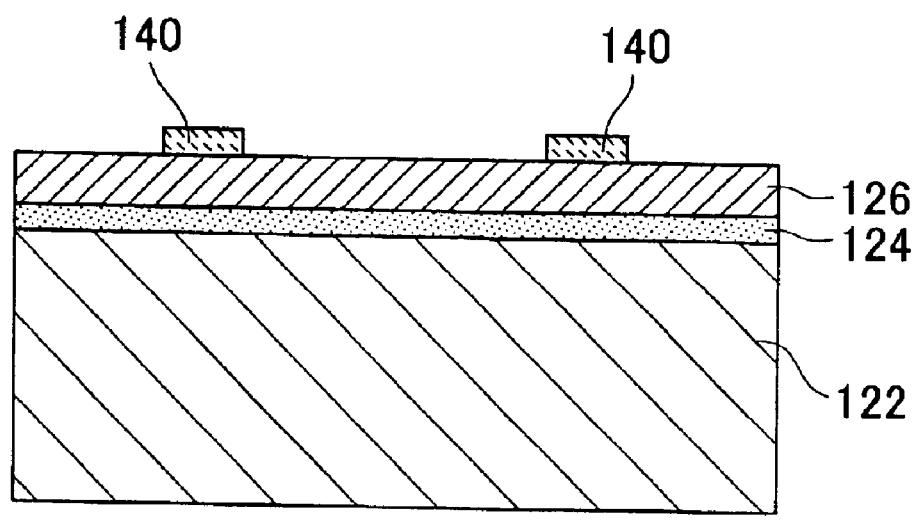
FIG. 3 illustrates a first step of a representative method for manufacturing the force detection device shown in FIG. 1.

FIG. 1 shows a perspective view of a first representative force detection device (piezoresistive transducer) 101 and FIG. 2 is a cross sectional view of FIG. 1 taken along the line II—II. As shown in FIG. 1, the force detection device 101 comprises a support platform 121, a force detection block 120 and a force transmission block 138. For the sake of clarity, the force transmission block 138 is represented with dashed lines in FIG. 1.

The support platform 121 may be solid with a substantially square top surface having a width (the length of one side of the square) of about 1.4 mm and a height of about 0.5 mm. The force detection block 120 may be affixed to the upper square surface of the support platform 121.

The force detection block 120 may be formed using commercially available SOI substrates (i.e., silicon on insulator substrates) or similar materials. The force detection block 120 may include four lower and wider bases 134a, 134b, 134c, 134d that project from a main surface of the force detection block 120. Four electrode bases 136a, 136b, 136c, 136d may be connected to the lower and wider bases 134a to 134d at the four respective corners. Four upper and narrower ridges 130a, 130b, 130c, 130d may respectively project from the lower and wider bases 134a to 134d.

Further, four electrodes 132a, 132b, 132c, 132d may be electrically connected to respective semiconductor regions (e.g., strain gages or more preferably, piezoresistive strain gages, which will be further discussed below) that possess the property changing electric resistance in response to a strain or stress applied thereto. These semiconductor regions or strain gages may be formed within the four upper and narrower ridges 130a to 130d. The four electrodes 132a, 132b, 132c, 132d may be connected to the semiconductor regions or strain gages at the four respective corners of the semiconductor regions or strain gages.

The force transmission block 138 may be mounted on the top surface of the upper and narrower ridges 130a to 130d and secured to the upper and narrower ridges 130a to 130d by electrostatic bonding or a similar method. The space surrounded by the lower and wider bases 134a to 134d, the upper and narrower ridges 130a to 130d, the main surface of the force detection block 120 and the lower surface of the force transmission block 138 may be isolated. When the pressure applied to the device 101 increases, the force applied to the top surface of the force transmission block 138 increases. However, the force applied to the lower surface of the force transmission block 138 remains unchanged. Therefore, a large stress may be applied to the four upper and narrower ridges 130a to 130d, when the pressure applied to the device 101 is increased.

The force transmission block 138 may be made of an insulating material having a square top surface. The width (the length of one side of the square) may be about 1.0 mm and the height of the force transmission block 138 may be about 0.5 mm. Representative insulating materials for making the force transmission block 138 include, e.g., borosilicate glass, crystalline glass or other types of glass containing mobile ions, silicon substrates having a surface covered with an insulating film and other similar materials.

When an external force (e.g., pressure) acts on or is applied to the top surface of the force transmission block 138, the force may be transmitted to the upper and narrower ridges 130a to 130d of the force detection block 120 via the force transmission block 138. As a result, a compression stress and strain develops or is generated within the ridges 130a to 130d.

As shown in FIG. 2, the lower and wider bases 134b, 134d may include second semiconductor layers 123b, 123d that are integral with the semiconductor substrate 122. First insulating layers 124b, 124d may cover the top surface of the lower and wider bases 134b, 134d. Further, second insulating layer 128 may cover the side faces of the lower and wider bases 134b, 134d. In addition, second insulating layer 128 also may cover the main surface of the semiconductor substrate 122. Although not shown in the drawing, the lower and wider bases 134a, 134c may be similarly configured.

The upper and narrower ridges 130b, 130d may each include first semiconductor layers 126b, 126d and the second insulating layer 128 that covers the top and side faces of the first semiconductor layers 126b, 126d. Although not shown in the drawing, upper and narrower ridges 130a, 130c may be similarly configured.

The first semiconductor layers 126b, 126d preferably comprise p-type (diffused dopant) silicon. In addition, the electric resistance of the first semiconductor layers 126b, 126d preferably changes in response to strain and stress generated within the first semiconductor layers 126b, 126d.

The first semiconductor layers 126a to 126d include active silicon layer 126. The first insulating layers 124a to 124d include oxidized silicon layer 124. Further, as noted above, the semiconductor substrate 122 (second semiconductor layers 123a to 123d) may be a SOI substrate. An n-type single crystal silicon block having a square top may be utilized to form the semiconductor substrate 122. The width of the square block may be about 1.4 mm and the height may be about 0.5 mm, so as to conform to the support platform 121. For example, the semiconductor substrate 122 may comprise gallium arsenide or another similar substance. However, the substrate 122 is not required to be formed from a semiconductor material.

As shown in FIG. 1, the top surfaces of the upper and narrower ridges 130a to 130d and the lower and wider bases 134a to 134d may have a substantially plateau or mesa-like shape and may be relatively long and narrow. The lengths of the four upper ridges 130a–130d and the four lower bases 134a–134d may be identical, or substantially identical and may have a square cross-section. The electrodes 132a–132d may extend from the four respective corners of the square formed by the upper ridges 130a–130d. The electrodes 132a–132d may be grouped as a first pair of input electrodes 132a, 132c and a second pair of output electrodes 132b, 132d, which are respectively formed at opposing corners. The electrode bases 136a–136d may extend from the four respective corners of the square formed by the four lower bases 134a–134d.

The top surfaces of upper ridges 130 and lower bases 134 are not required to be a planar or mesa shape. In the alternative, the top surfaces of ridge 130 and base 134 may have, e.g., a curved shape in transversal cross section.

The top surface of the active silicon layer 126 within the upper ridge 130 is the (110) surface. The first semiconductor layers (strain gages) 126a–126d are disposed within the upper ridges 130a–130d and are positioned so that their electric resistance will change in accordance with a piezo-resistance coefficient of $\delta_{13}'$. A first pair of the first semiconductor layers 126b, 126d is disposed within the upper ridges 130b, 130d and extends lengthwise in the direction <110>. On the other hand, a second pair of the first semiconductor layers 126a, 126c is disposed within the upper ridges 130b, 130d and extends lengthwise in the direction <100>. The four first semiconductor layers 126a–126d may define a Wheatstone bridge.

If the piezo-resistance coefficient is $\delta_{13}'$, maximum sensitivity is in the <110> direction of the (110) surface, whereas sensitivity in the <100> direction is zero. When a stress is applied to the first semiconductor layers 126a, 126b, 126c, 126d (strain gage), the electric resistance of the first pair of the first semiconductor layers 126b, 126d, which extend lengthwise along the <110> direction, changes (increases) in accordance with the stress due to the piezo-resistance effect. On the other hand, the electric resistance of the second pair of the first semiconductor layers 126a, 126c, which extend lengthwise along the <100> direction, does not change. Thus, the first pair of the first semiconductor layers 126b, 126d function as gauge resistors and the second pair of the first semiconductor layers 126a, 126c function as reference resistors.

As noted above, the first semiconductor layer (strain gage) 126 may comprise a layer of p-type dopant diffused into the active silicone of the SOI. The concentration of the p-type dopant may be of the order of about $1 \times 10^{18}/cm^3$ to about $1 \times 10^{20}/cm^3$. The electric resistance rate may be about 0.001 Ű cm. U.S. Pat. No. 5,773,728, the contents of which are incorporated herein by reference, teaches dopant concentrations sufficient to impart temperature compensation properties. Although the first semiconductor layer 126 may have a relatively high dopant concentration ratio and a relatively low electric resistance rate, each first semiconductor layer 126 is preferably narrow, thin and long. Therefore, the resistance of each first semiconductor layer 126 is sufficient to measure resistance changes.

Referring again to FIG. 2, the width L1 of the first semiconductor layer 126 that constitutes the upper ridge 130 may be approximately 10 ìm. The width (thickness) L2 of the second insulating layer 128 may be approximately 0.1 ìm. Therefore, the width L3 of the upper ridge 130 may be approximately 10+0.1×2 (i.e., approximately 10.2 ìm). The height L7 of the upper ridge 130 may be approximately 3 ìm. The width L4 of the first insulating layer 124 and the second semiconductor layer 123 may be approximately 14 ìm. Further, the width (thickness) L5 of the second insulating layer 128 may be approximately 0.1 ìm. Therefore, the width L6 of the lower base 134 may be approximately 14+0.1×2 (i.e., approximately 14.2 ìm). The height L8 of the lower base 134 may be about 3.5 ìm. The height L8 of the lower base 134 is preferably equal to or greater than 3 ìm. In this first representative embodiment, the width L4 (about 14 ìm) of the first insulating layer 124 is preferably about 4 ìm greater than the width L1 (about 10 ìm) of the first semiconductor layer 126 and is about 2 ìm wider on each side.

A representative method for operating the force detection device 101 of the first embodiment will now be described.

For example, positive voltage may be applied to the electrode 132a. Further, the electrode 132c formed at the opposing corner of the electrode 132a is connected to ground. When an external force W acts on the top surface of the force transmission block 138 in this state, the external force W is transmitted to the first semiconductor layers (strain gages) 126a, 126b, 126c, 126d. Therefore, the resistance of the strain gages 126b, 126d increases in accordance with the strain and stress generated within the strain gages 126b, 126 due to the external force W applied thereto. However, the resistance of the strain gages 126a, 126c will not change. Consequently, the voltage generated at the output electrode 132b can be represented as follows:

$$V_{at\ 132b} = V_{at\ 132a} \times R_{of\ 126c}/(R_{of\ 126b} + R_{of\ 126c})$$

When the resistance of strain gage 126b increases and the resistance of strain gage 126c does not change, voltage $V_{at\ 132b}$ generated at output electrode 132b is reduced. The voltage generated at the output electrode 132d can be represented as follows:

$$V_{at\ 132d} = V_{at\ 132a} \times R_{of\ 126d}/(R_{of\ 126a} + R_{of\ 126d})$$

When the resistance of strain gage 126d increases and the resistance of strain gage 126a does not change, voltage $V_{at\ 132d}$ generated at output electrode 132d increases.

By measuring voltage differences between $V_{at\ 132b}$ and $V_{at\ 132d}$, the magnitude of the resistance change of the strain gages 126b, 126d can be calculated. Therefore, the magnitude of the external force W applied to the force transmission block 138 can be determined based upon the amount of the resistance change in the strain gages 126b, 126d. By utilizing a Wheatstone bridge to measure these resistance changes, high sensitivity can be obtained and fluctuations due to noise and other environmental factors can be compensated.

Figure 4:
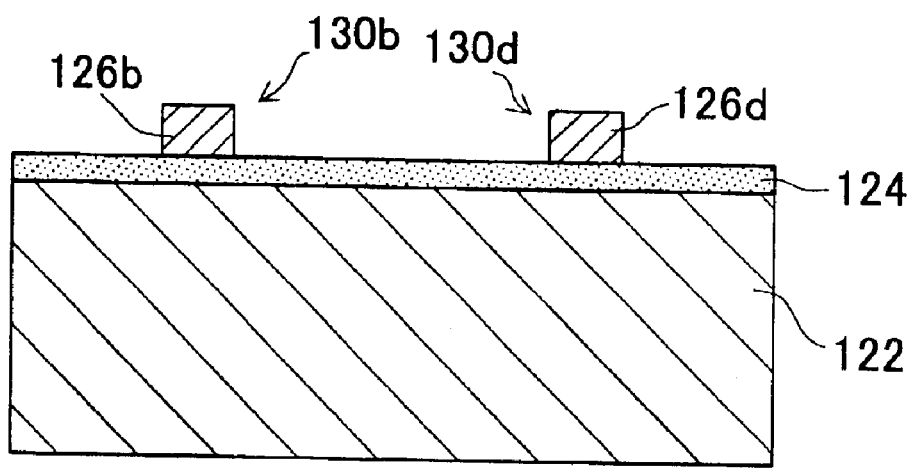
FIG. 4 illustrates a second step of the representative method for manufacturing the force detection device shown in FIG. 1.

A representative method for manufacturing the force detection device 101 of the first representative embodiment shown in FIGS. 1 and 2 will be described with reference to FIGS. 3–7. First, an SOI substrate, such as the SOI substrate shown in FIG. 3, may be prepared. As noted above, known SOI substrates may be utilized with the present teachings and thus, a detailed discussion of the SOI substrate may be omitted. The SOI substrate preferably includes the silicon substrate 122, the oxidized silicon layer 124 layered onto the silicon substrate 122, and the active silicon layer 126 layered on the oxidized silicon layer 124. A first resist layer 140 may be disposed on a predetermined area of the active silicon layer 126, which is then etched using reactive ion etching (RIE) or another similar technique. The upper and narrow ridges 130b, 130d comprising the first semiconductor layers 126b, 126d are formed in the predetermined area. As shown in FIG. 4, the first semiconductor layers 126b, 126d project from the top surface of the oxidized silicon layer 124.

Figure 5:
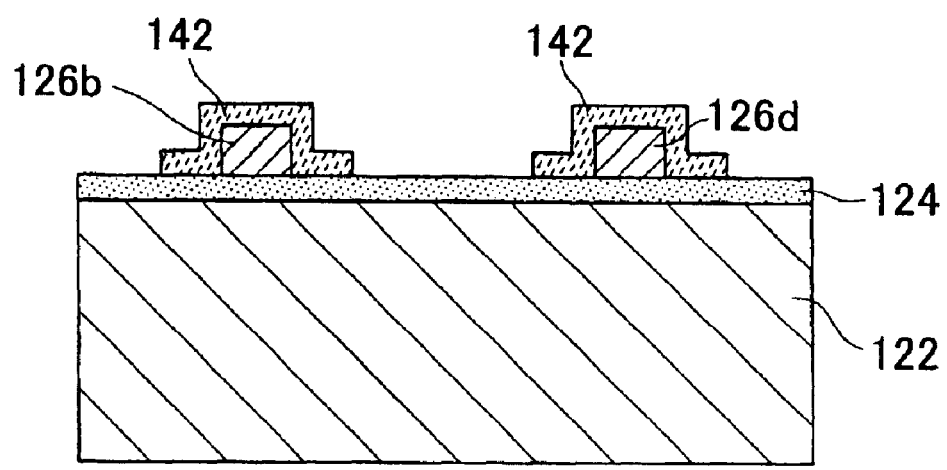
FIG. 5 illustrates a third step of the representative method for manufacturing the force detection device shown in FIG. 1.
Figure 6:
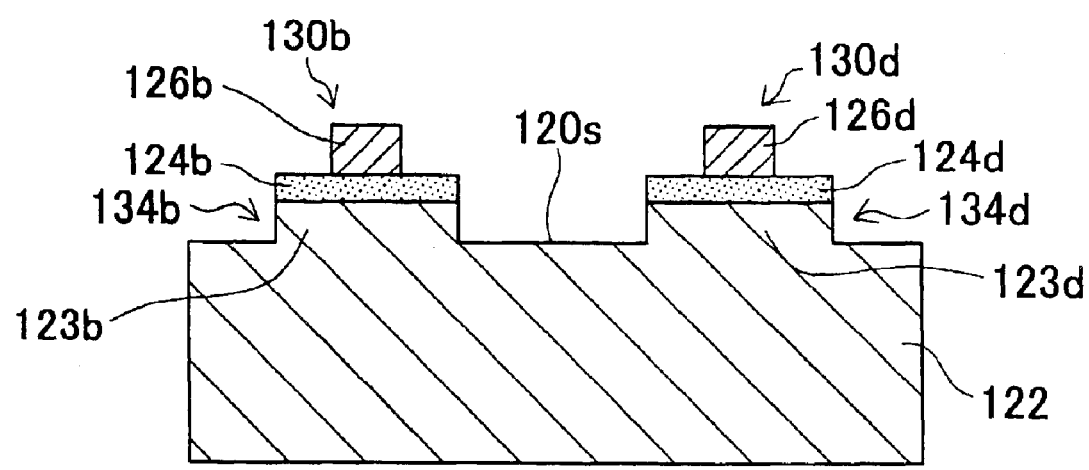
FIG. 6 illustrates a fourth step of the representative method for manufacturing the force detection device shown in FIG. 1.

As shown in FIG. 5, a second resist layer 142 is disposed over a relatively wide portion in order to mask the first semiconductor layers 126b, 126d and then anisotropic etching is performed using RIE or another method. As shown in FIG. 6, the lower and wider bases 134b, 134d, which include the first insulating layers 124b, 124d and the second semiconductor layers 123b, 123d, are thus formed. The lower and wider bases 134b, 134d projects from the main surface 120s of the SOI substrate 122.

Figure 7:
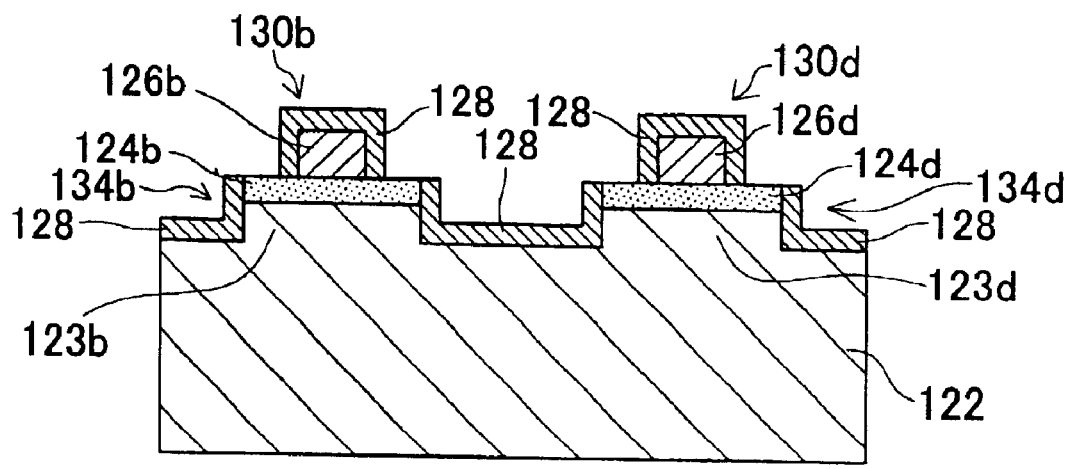
FIG. 7 illustrates a fifth step of the representative method for manufacturing the force detection device shown in FIG. 1.

Next, as shown in FIG. 7, the top and side faces of the upper and narrower ridges 126, the side surfaces of lower and wider bases 134 and the main surface of the silicon substrate 122 are oxidized using heat oxidization or another similar method to form the second insulating layer 128, which comprises an oxidized silicon layer. Consequently, force detection block 120 is completed. As shown in FIG. 1 and FIG. 2, the force transmission block 138 is then affixed to the top surface of the upper ridge 130 (more accurately, the second insulating layer 128), e.g., using electrostatic bonding.

According to this representative manufacturing method, as shown in FIG. 5, the second resist layer 142 covers a relatively wide portion around the first semiconductor layers 126b and 126d, which will eventually define a portion of the upper ridges 130. At the same time, this relatively wide resist layer 142 also may be utilized to form a relatively wider first insulating layer 124 and a relatively wider lower projecting second semiconductor layer 123. Thus, the single resist layer 142 can form the wider lower base 134 and this method is a particularly efficient way to produce piezoresistive transducers.

The resulting force detection block 120 includes a combination of narrow first semiconductor layers (strain gages) 126 and wider first insulating layers 124. This combination effectively suppresses current leakage from the first semiconductor layers (strain gages) 126 to the outside (e.g., the silicon substrate 122). Two stepped ridges 126, 123 define a large gap between the lower surface of the force transmission block 138 and the main surface 120s of the silicone substrate. This large gap prevents the force transmission block 138 from contacting the force detection block 120, even if the force transmission block 138 bends due to a large external force acting on the force transmission block 138.

The second insulating layer 128 may be formed using a heat oxidizing method in order to impart satisfactory mechanical and electrical qualities. Therefore, current leakage from the strain gages 126 to the outside can be effectively suppressed. However, the oxidized silicon layer constituting the second insulating layer 128 also may be formed, e.g., using CVD.

Moreover, the force transmission block 138 is not required to be electrostatically joined. Instead, the force transmission block 138 may be affixed, e.g., by solder or adhesive.

When an external force W is applied to the force transmission block 138, the resistance of the first semiconductor layer 126 changes due to the stress applied thereto. In this state, current leakage from the first semiconductor layer 126 is highly possible. However, the width L4 of the first insulating layer 124 (approximately 14 ìm) of the first representative force detection device 101 is about 4 ìm (about 2 ìm per side) wider than the width L1 of the first semiconductor layer 126 (approximately 10 ìm). Therefore, current flowing through the first semiconductor layer 126 is effectively prevented from leaking to the outside (e.g., to the second semiconductor layer 123 of the semiconductor substrate 122) due to the combination of narrow first semiconductor layer 123 and wider first insulating layer 124. Thus, surface leakage (i.e., current leakage from the first semiconductor layer 126 to the second semiconductor layer 123 or the force transmitting block 138) is particularly effectively suppressed, even at high temperatures. If the force detection device 101 is manufactured using the SOI substrate 120, the first semiconductor layer 126 and the second semiconductor layer 123 can be easily manufactured with a partitioned construction using the first insulating layer 124.

The force detection device (piezoresistive transducer) described by U.S. Pat. No. 5,773,728 exhibited current leakage of approximately $10^{-3}$ to $10^{-2}$ (0.1%–1%) of the current passing therethrough (i.e., current leakage on the order of several milli-amps). On the other hand, the first representative force detection device 101 reduced current leakage to about $10^{-6}$ of the current passing therethrough (i.e., current leakage on the order of nano-amps). Consequently, the voltage generated at the output electrodes 132b, 132d is prevented from changing due to current leakage, thereby providing high detection precision with respect to the resistance changes in the strain gages 126b, 126d. Therefore, the force detection device 101 can detect the magnitude of the external force W acting thereon with high precision.

Further, the total of the height L7 of the upper ridge 130 and the height L8 of the lower base 134 is set to be at least 6 ìm. As a result, contact between the force transmission block 138 and the semiconductor substrate 122 (the second insulating layer 128) is avoided, even if the force transmission block 138 sags downward and deforms as shown in FIG. 2 when a large external force acts on the force transmission block 138. Therefore, it is possible to prevent decreases in the force detection precision or detection sensitivity, even when a large external force acts on the force transmission block 138.

Second Representative Embodiment

Figure 8:
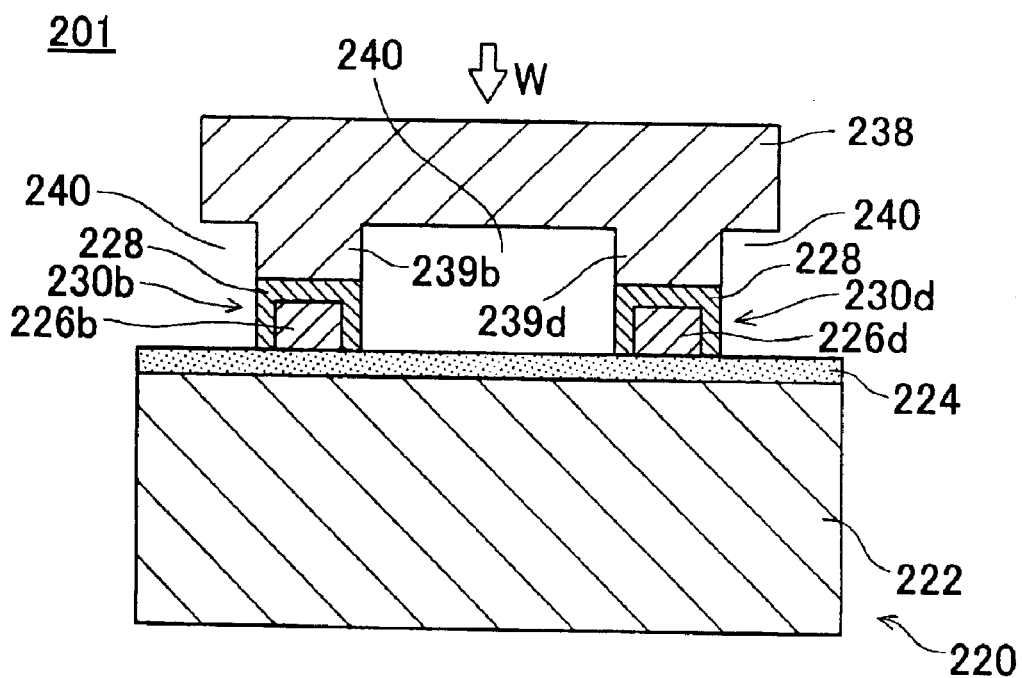
FIG. 8 is a cross sectional view of a second representative force detection device.

FIG. 8 is a cross sectional view of a second representative force detection device (piezoresistive transducer) 201, which cross sectional view corresponds to the cross sectional view shown in FIG. 2. As shown in FIG. 8, the second representative force detection device 201 includes a force detection block 220 and a force transmission block 238. Ridges 230b, 230d project from the top surface of the force detection block 220. Legs 239 extend from the bottom surface of the force transmission block 238. Although not shown in the drawings, four ridges 230a, 230b, 230c, 230d preferably form a square on the top surface of the force detection block 220. Further, four legs 239a, 239b, 239c, 239d preferably form a square having the same size on the bottom surface of the force transmission block 238. The top faces of the ridges 230 may be adhered or affixed to the bottom surfaces of the legs 239, similar to the first representative embodiment discussed above.

Each ridge 230b, 230d may include a second insulating layer 228 that covers the top and side surfaces of first semiconductor layers 226b, 226d. The force transmission block 238 is preferably defined such that the legs 239b, 239d joined to the top surface of ridge 230 protrude downwardly from the bottom surface of the force transmission block 238. The first insulating layer 224 and the force detection block 220 may have identical widths. In other words, the first insulating layer 224 may be formed across the entire upper surface of the force detection block 220. As in the first representative embodiment, the width of the force detection block 220 may be approximately 1.4 mm and the width of the first semiconductor layer 226 may be approximately 10 ìm. The former is much wider than the later.

A representative method for manufacturing the second representative force detection device 201 shown in FIG. 8 will be described. First, the first semiconductor layer 226 may be formed in the same manner as was discussed above with reference to FIGS. 3 and 4. Then, the top and side surfaces of the first semiconductor layer 226 may be oxidized, e.g., by heat oxidization, to form the second insulating layer 228 that includes an oxidized silicon layer. In addition, legs 239 are formed from a glass block in order to define the force transmission block 238 as shown in FIG. 8. Representative methods for forming legs 239 include a chemical processing method, in which the site indicated by reference symbol 240 is etched and removed with hydrofluoric acid or another substance. In the alternative, a physical-mechanical processing method for cutting away site 240 using a sandblaster, a dicer, or another technique may be used.

Thereafter, the top portion of ridges 230b, 230d (i.e., the second insulating layer 228) and the bottom surfaces of legs 239b, 239d of the force transmission block 238 are attached, e.g., by electrostatic bonding.

If leg 239 is formed on the force transmission block 238 and the site 240 on the side of leg 239 with a recessed shape, the force transmission block 238 may be defined so as to prevent contact with the first insulating layer 224 (the force detection block 220), even if a relatively large external force acts on the force transmission block 238.

Third Representative Embodiment

Figure 9:
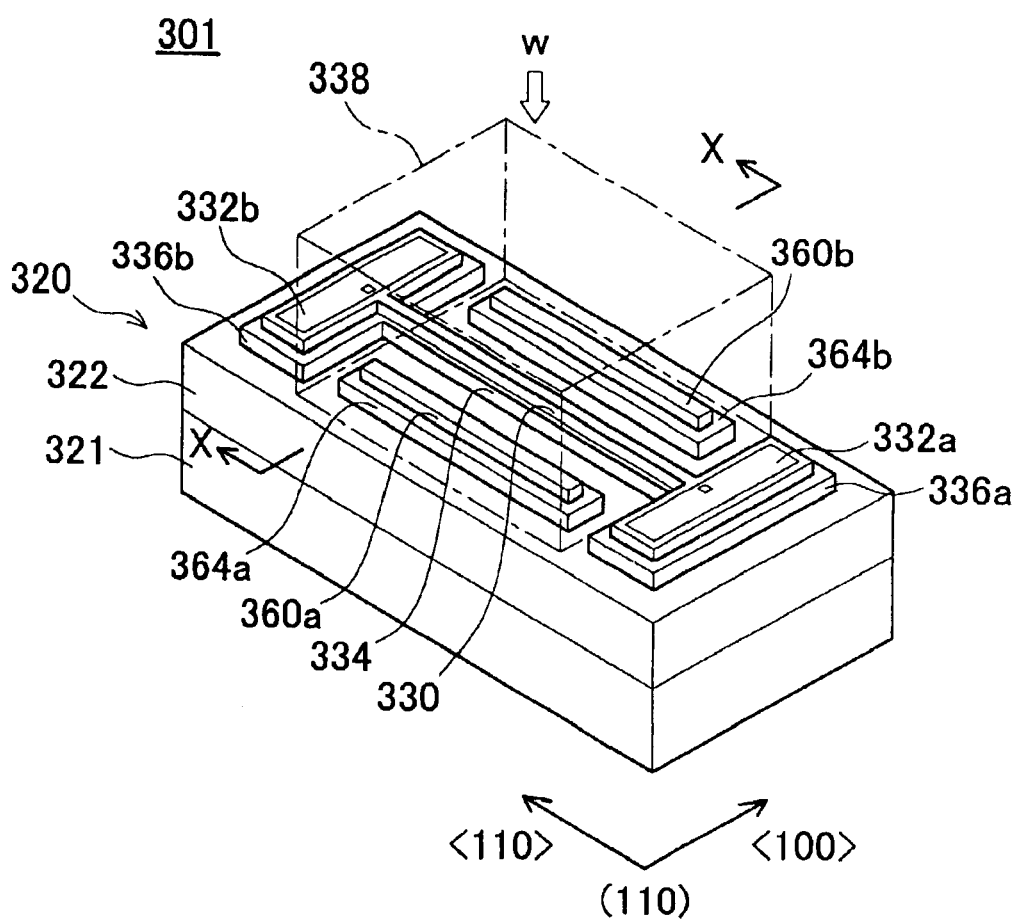
FIG. 9 is a perspective view of a third representative force detection device.
Figure 10:
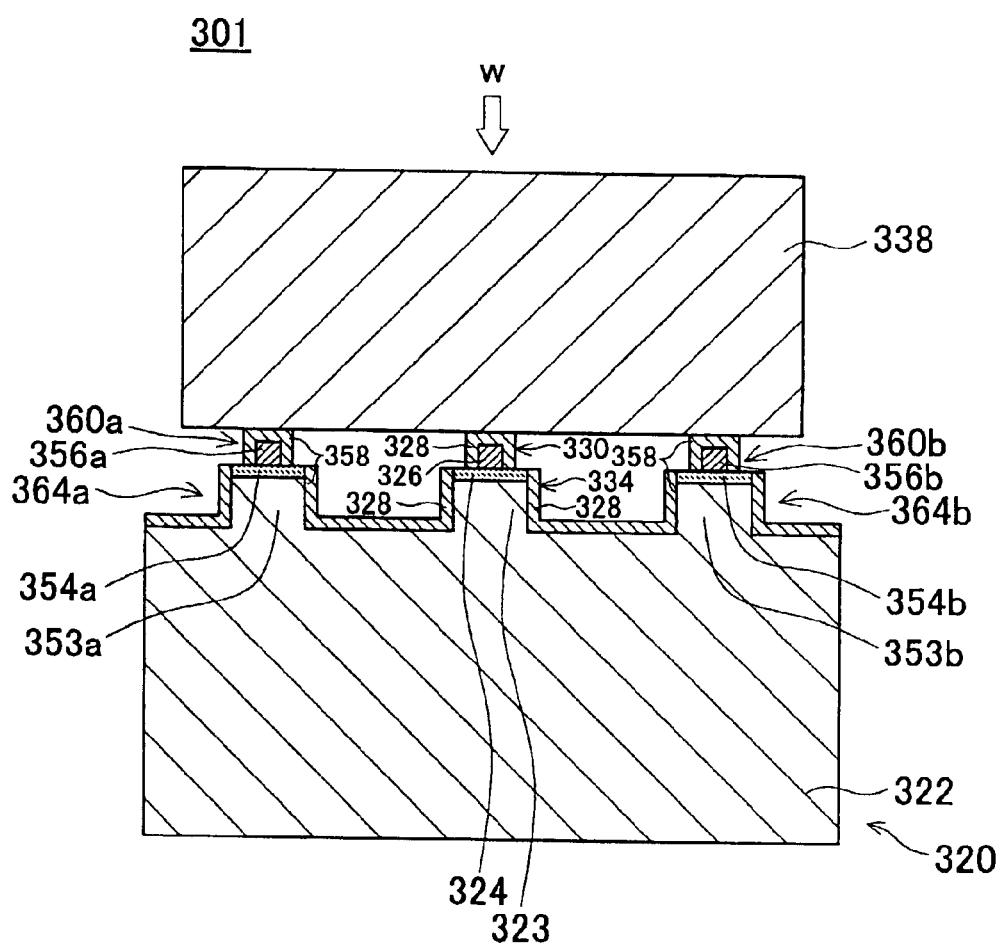
FIG. 10 is a cross sectional view taken along line X—X shown in FIG. 9.

FIG. 9 is a perspective view of a third representative force detection device (piezoresistive transducer) 301 and FIG. 10 shows a cross sectional view taken along line X—X shown in FIG. 9. As discussed above, the first representative force detection device 101 shown in FIG. 1 defines a Wheatstone bridge using the four first semiconductor layers 126a–126d. In contrast, the third representative force detection device 301 shown in FIGS. 9 and 10 has a relatively simple strain gage construction using a single first semiconductor layer 326.

Referring to FIG. 9, the force detection device 301 may include a support platform 321, a force detection block 320 and a force transmission block 338. A lower and wider base 334 may project from the main surface of the force detection block 320. First electrode bases 336a, 336b may be connected to the lower and wider base 334. First upper and narrower ridge 330 may project above the lower and wider base 334. Further, electrodes 332a, 332b may be electrically connected to a first semiconductor layer (strain gage) disposed within the upper and narrow ridge 330, which will be further discussed below.

Second bases 364a, 364b also may project from the main surface of the force detection block 320. Second ridges 360a, 360b may respectively project above the second bases 364a, 364b. A force transmission block 338 may be securely attached in a stable manner to the top surface of the first ridge 330 and the second ridges 360a, 360b of the force detection block 320 using electrostatic bonding due to the shapes of the first ridge 330 and the second ridges 360a, 360b.

As shown in FIG. 10, the first (lower and wider) base 334 may include a first insulating layer 324, a second semiconductor layer 323 and a second insulating layer 328 that covers the front surface (side surface) of the second semiconductor layer 323. A first semiconductor layer 326 and the second insulating layer 328 that covers the front surface of the first semiconductor layer 326 may define the first ridge 330. Similar to the first embodiment, the first semiconductor layer 326 may serve as a strain gage to which n-type or p-type dopant has been added.

The second bases 364a, 364b may include a third insulating layer 354, a fourth semiconductor layer 353 and a fourth insulating layer 358 that covers the front surface (side surface) of the fourth semiconductor layer 353. The second ridges 360a, 360b may be defined by third semiconductor layers 356a, 356b and a fourth insulating layer 358 that covers the front surface of the third semiconductor layers 356a, 356b. The third semiconductor layers 356a, 356b are preferably different from the first semiconductor layer 326 and do not function as a strain gage, but may be n-type.

The top surface of the first ridge 330 is the (110) surface. Further, the first semiconductor layer 326 (strain gage)

defined within the first ridge 330 is arranged so that its resistance changes in accordance with the piezoresistance coefficent $\delta_{13}$. The first semiconductor layer 326 extends lengthwise in the <110> direction. As was discussed above, maximum sensitivity is achieved in the <110> direction of the (110) surface when the piezoresistance coefficient is $\delta_{13}'$.

In the third representative force detection device 301, the width of the first insulating layer 324 (about 14 ìm) preferably is approximately 4 ìm greater than the width of the first semiconductor layer 326 (about 10 ìm), similar to the first embodiment. Further, the width of the first insulating layer 324 preferably is about 2 ìm wider on each side of the first semiconductor layer 326.

A representative method for operating the third representative force detection device 301 will now be described. For example, electrode 332a may be connected to a power supply and electrode 332b may be connected to ground. When an external force W acts on the top surface of the force transmission block 338 in this configuration, the external force W is transmitted to the first semiconductor layer 326 (strain gage). Consequently, the resistance of the strain gage 326 increases in accordance with the stress acting thereon resulting from the external force W. Therefore, the voltage at the electrode 332a increases in accordance with the increase in resistance of the strain gage 326. By detecting the increase in the voltage at the electrode 332a, the amount of resistance change in the strain gage 326 can be determined. In addition, the amount of resistance change in the strain gage 326 can be used to determine the magnitude of the external force W acting thereupon. In the third representative embodiment, the electrode 332a may function both as an input electrode and an output electrode.

By utilizing a simple gauge construction in the third representative embodiment instead of a bridge construction, a larger change in the output may result from application of an external force having a given magnitude. As a result, the detection sensitivity of external forces can be increased.

Moreover, the simply constructed force detection device 301 is easier to manufacture than elements of a bridge construction and the manufacturing process can be simplified. Further, a single gauge construction permits only two electrodes, namely, the input/output electrode and the ground electrode. The ground electrode may be connected to a grounded metal piece without wire at the same time as fixing the device to the metal piece. Therefore only single wire may be necessary for connecting to the input/output electrode. Single wire may be formed within a metal part for installing the device. Two electrode devices greatly reduce troublesome wiring operations and overcome unreliable wire connection. However, even if the two electrodes are connected with wires, the negative consequences of wire connections are less than when four wires are connected to four electrodes.

A simple gauge construction is not limited to a strain gage constituted by only one resistor. Even if multiple resistors are utilized, a construction in which one terminal of each of the resistors is connected to a common first electrode and the other terminal of the each of the resistors is connected in common to a second electrode (a construction in which a plurality of resistors are connected in parallel) is equivalent to a single gauge construction.

Fourth Representative Embodiment

Figure 11:
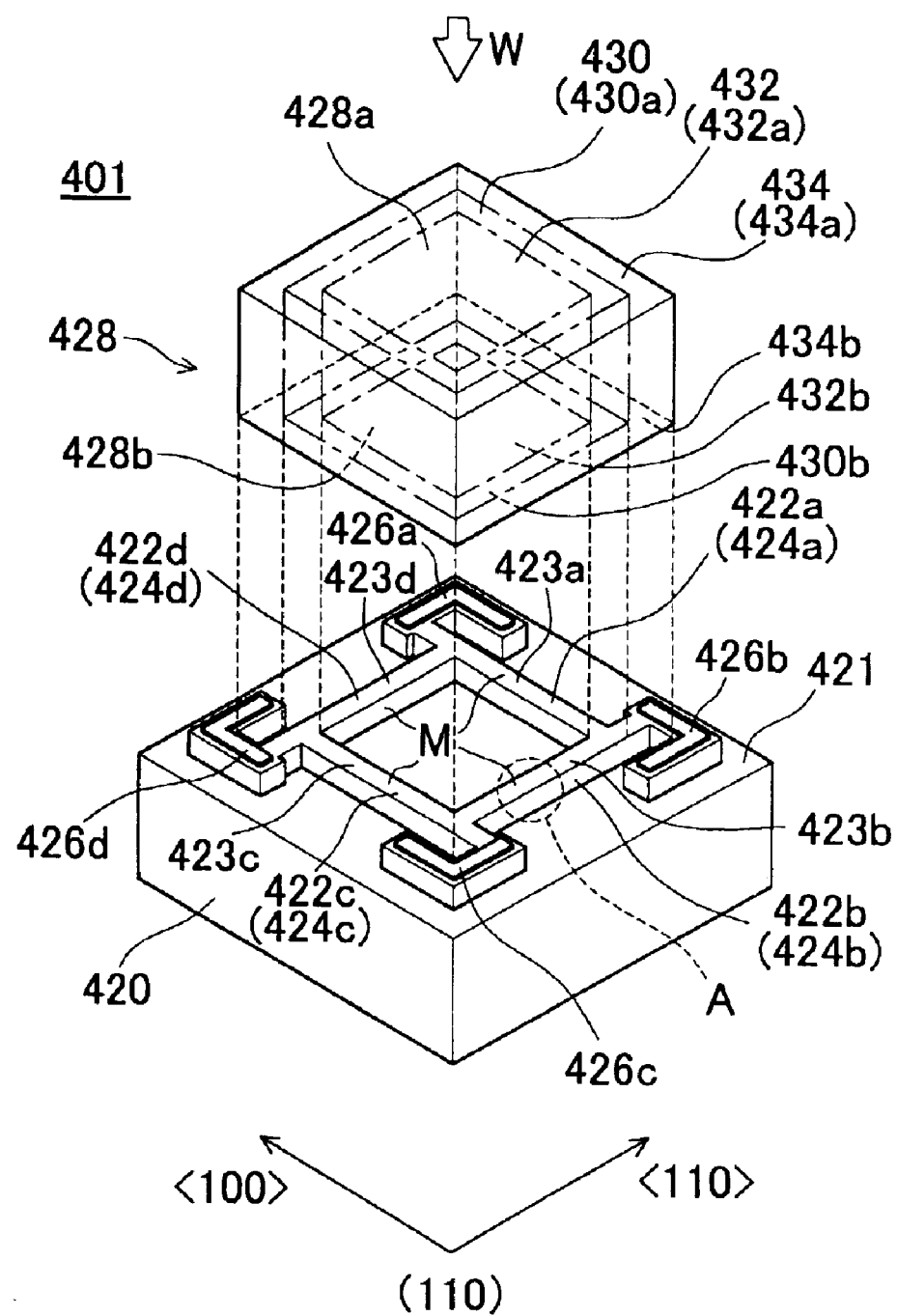
FIG. 11 is a perspective view of a fourth representative force detection device.

FIG. 11 is a perspective view of a fourth representative force detection device (piezoresistive transducer) 401. Elements that have the same function in the first representative embodiment will not be described in detail and the description of the first representative embodiment with respect to such elements is incorporated into the fourth representative embodiment.

The force detection device 401 may include a force detection block 420 (which equivalent to the semiconductor block and the force detection block of the first representative embodiment) and a force transmission block 428 (which may be equivalent to the force transmission block of the first representative embodiment). The force detection block 420 may comprise an n-type single crystal silicon block or a similar structure. Ridges 422a–422d may project from main surface 421 of the force detection block 420. Electrodes 426a–426d may be formed near the four corners of ridges 422a–422d and each may have a substantially square shape. The electrodes 426a–426d may be electrically connected to the terminals of a strain gage 424 (see FIG. 12), which will be described further below.

Similar to the first representative embodiment, the force transmission block 428 may comprise an insulating material. Top surfaces 423a–423d of the rectangular shaped ridges 422a–422d may be securely attached using electrostatic bonding to a portion of bottom surface 428b of the force transmission block 428 (e.g., bottom surface 430b of overlapping region 430, which will be further described below). The entire top surface 423 of ridges 422 may define joined surface M (e.g., an example of a contact surface). Electrostatic bonds preferably join the blocks 420, 428. However, blocks 420, 428 also may be effectively soldered or attached utilizing diluted hydrofluoric acid, which serves as an adhesive for joining oxidized films on the surfaces. In the alternative, the blocks 420, 428 may simply contact each other.

The force transmission block 428 may include overlapping region 430, which the joined surface M (the top surface 423 of ridge 422) overlaps when viewed in the direction perpendicular to the joined surface M (above or below in FIG. 11). In addition, the force transmission block 428 may include non-overlapping regions 432, 434, in which there is no overlap. The non-overlapping region 432 is defined on one side of the joined surface M of ridges 422a–422d when viewed in the direction perpendicular to the joined surface M, and the non-overlapping region 434 is defined on the other side. In other words, the non-overlapping regions 432, 434 fall on either side of the joined surface M of ridges 422a–422d. Surfaces 430a, 432a, 434a for receiving an external force extend in the direction parallel to the joined surface M and are formed respectively on the overlapping region 430 and the non-overlapping regions 432, 434. The surfaces 430a, 432a, 434a are defined on the top surface 428a of the force transmission block 428.

The entire bottom surface 428b of the force transmission block 428 preferably is planar. The bottom surface 428b is defined by the bottom surface 430b of the overlapping region 430 and the bottom surfaces 432b, 434b of the non-overlapping regions 432, 434.

Figure 12:
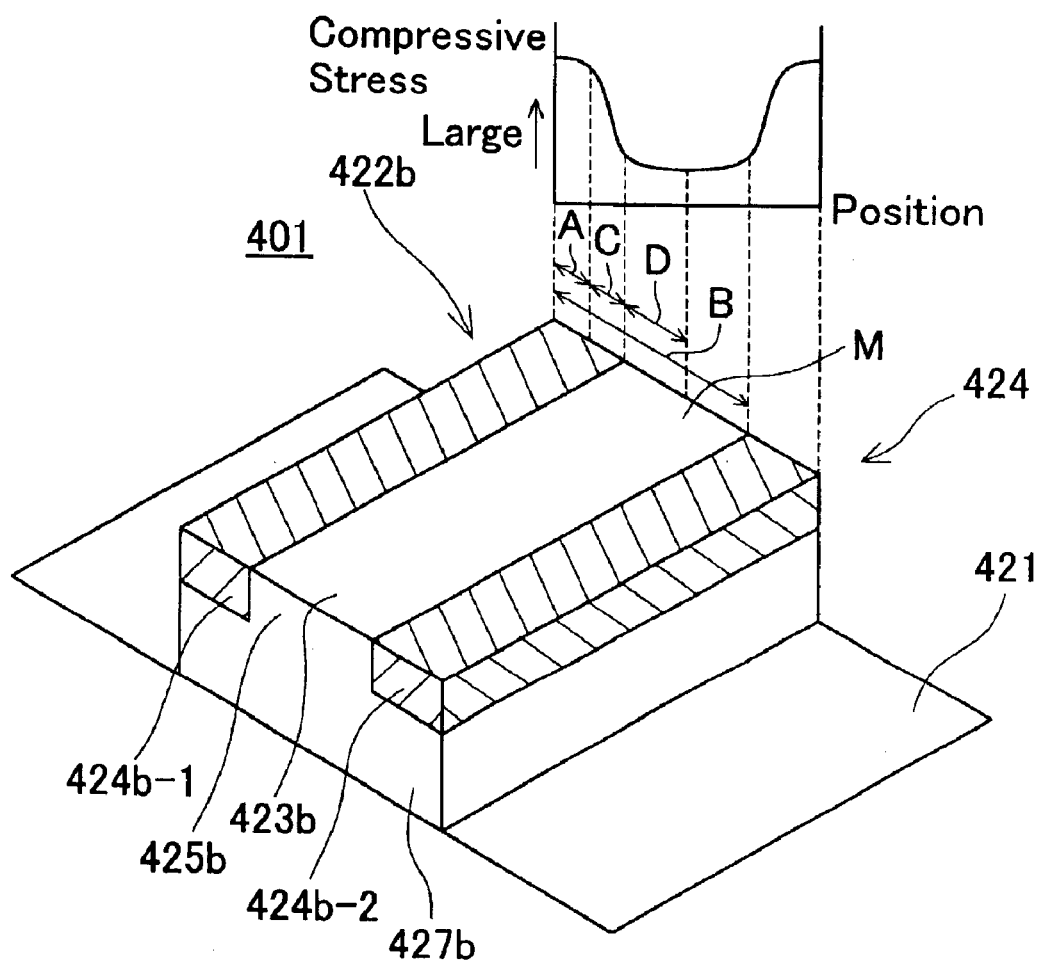
FIG. 12 is an enlarged perspective view of the ridge of the fourth representative force detection device.

The semiconductor portion of ridges 422 of the force detection block 420 may be a part of an n-type silicon block, so as to initially provide an n-type silicon layer. A representative ridge 422b is shown in FIG. 12, in which strain gages 424b-1, 424b-2 of the n-type semiconductor layer 427b constituting ridge 422b are locally formed on either side of the top portion. The strain gages 424b-1, 424b-2 are preferably p-type diffused regions, which may be formed by adding p-type dopants to the n-type semiconductor layer 427. The p-type strain gage 424b and the n-type semiconductor layer 427b are insulated by a separated p-n junction.

Similar to the first representative embodiment, a Wheatstone bridge may be defined by the four strain gages 424a–424d. For example, the strain gages 424b, 424d may function as a gauge resistor, in which resistance changes due to piezoresistance effects in accordance with compressive stresses acting thereon. On the other hand, the strain gages 424a, 424c may function as reference resistors, in which resistances change very little when acted upon by a compressive stress.

A representative compressive stress distribution is illustrated in FIG. 12, in which a relatively larger amount of compressive stress is acting on (or being applied to) the respective sides of ridge 422b and a relatively smaller amount of compressive stress is acting on (or being applied to) the middle of the ridge 422b. As noted above, the strain gages 424a–424d are locally formed on both sides of the top portion of ridge 422. On average, more stress acts on the side portions than on the top portion as a whole, as is shown in the example of ridge 422b (strain gage 424b) in FIG. 12.

The main surface 421 and ridge 422 of the force detection block 420 may be covered by an oxidized silicon film (insulating film), which is not shown in FIG. 11. By covering these parts with an insulating film, current flowing through the strain gage 424 formed on ridge 422 is prevented from leaking.

By locally forming the strain gage 424 on both sides of the top portion of ridge 422, where on average more stress acts than on the top portion as a whole, the fourth representative force detection device 401 may have high detection sensitivity in which the amount of resistance change of the strain gage 424 is greater than in a strain gage formed over the entire protruding part (such as the prior art). Thus, the fourth embodiment provides relatively high sensitivity without reducing the surface area of the joined surface M of ridge 422.

Furthermore, high sensitivity may be realized in the fourth representative force detection device 401, even if the width of the long, narrow ridges 422a–422d is increased to a certain extent. If the width is increased to a certain extent, the likelihood that ridges 422a–422d will be damaged by compressive stress acting thereon is extremely low. In addition, the force transmission block 428 can be supported in a stable manner using ridges 422a–422d. By forming the strain gage 424 on both sides of the top portion of ridge 422, the level of sensitivity will be more stable than when the strain gage is formed on only one side.

The region forming the strain gage 424b shown in FIG. 12 may be modified as follows. For example, the width of the region forming the strain gage 424b may be narrower or wider than shown in FIG. 12. If the width is reduced, the strain gage 424b is preferably formed locally in the region of range A (near the periphery of ridge 422b) on which large compressive stresses act. Such a configuration allows the amount of resistance change to be increased (i.e., sensitivity can be increased). If the width is increased, the strain gage 424b must be formed so that resistance changes do not become smaller than when the strain gage 424b is formed on the entire top portion of ridge 422b, so as to provide high sensitivity.

For example, if the amount of resistance change of the strain gage 422b is greater than when the strain gage is formed on the entire top portion of ridge 422b when the strain gage 424b is locally formed in the region of range C, a configuration is possible in which the strain gage 424 is formed locally in the region of range C and the strain gage is not formed in the region of range A, which is closer to the non-overlapping region 432.

Fifth Representative Embodiment

Figure 13:
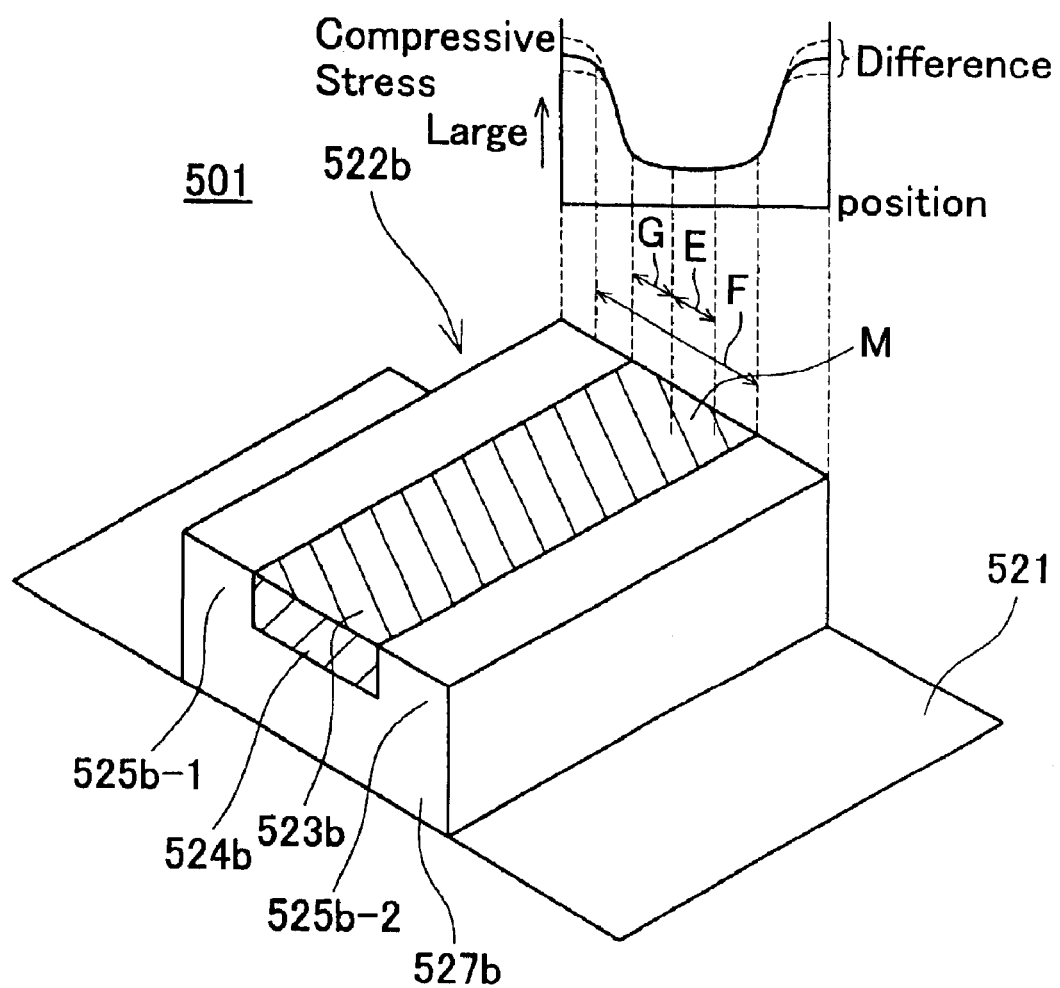
FIG. 13 is an enlarged perspective view of the ridge of a fifth representative force detection device.

FIG. 13 is an expanded perspective view of ridge 522b of the fifth representative force detection device 501.

Hereinafter, the description will focus mainly on the unique characteristics of the fifth embodiment as compared to the fourth embodiment. The same is true for the descriptions of the following embodiments.

The expanded view of FIG. 13 corresponds to the expanded view of ridge 422b of the force detection device 401 of the fourth representative embodiment shown in FIG. 12. The ridge 522b shown in FIG. 13 includes a strain gage 524b, which is a p-type diffused region defined within an n-type semiconductor layer 527b. Thus, strain gage 524b is formed locally in the top, middle portion of ridge 522b.

As the illustration of the compressive stress distribution shows in FIG. 13, the compressive stress acting on (or being applied to) the middle portion of ridge 522b is less than the compressive stress acting on (or being applied to) the side portions of ridge 522b. However, fluctuations in the compressive stress between a plurality of force detection devices, such as the fluctuations shown by dotted lines, is less at the middle portion of ridge 522b than at the side portions of ridge 522b. Therefore, by forming the strain gage 524 locally in the middle portion widthwise on ridge 522 as shown in FIG. 13, smaller fluctuations result in the resistance changes (the detection sensitivity) of the strain gage 524 between the plurality of force detection devices forming the strain gage 524.

The region forming the gauge resistor 524b shown in FIG. 13 may be modified as follows. For example, the width of the region forming the gauge resistor 524b may be made narrower or wider than shown in FIG. 13. If the width is increase, the gauge resistor 524b is preferably formed locally in the region of range E (near the center of ridge 522b) where compressive stress is distributed more evenly. Such a configuration decreases fluctuations in the amount of resistance change among a plurality of force detection devices.

Moreover, the strain gage 524b can be locally formed in the region of range G rather than in the region of range E (near the center of ridge 522b). Even in this configuration, fluctuations in the amount of resistance change of the strain gage 524b among a plurality of force detection devices can be decreased.

Sixth Representative Embodiment

Figure 14:
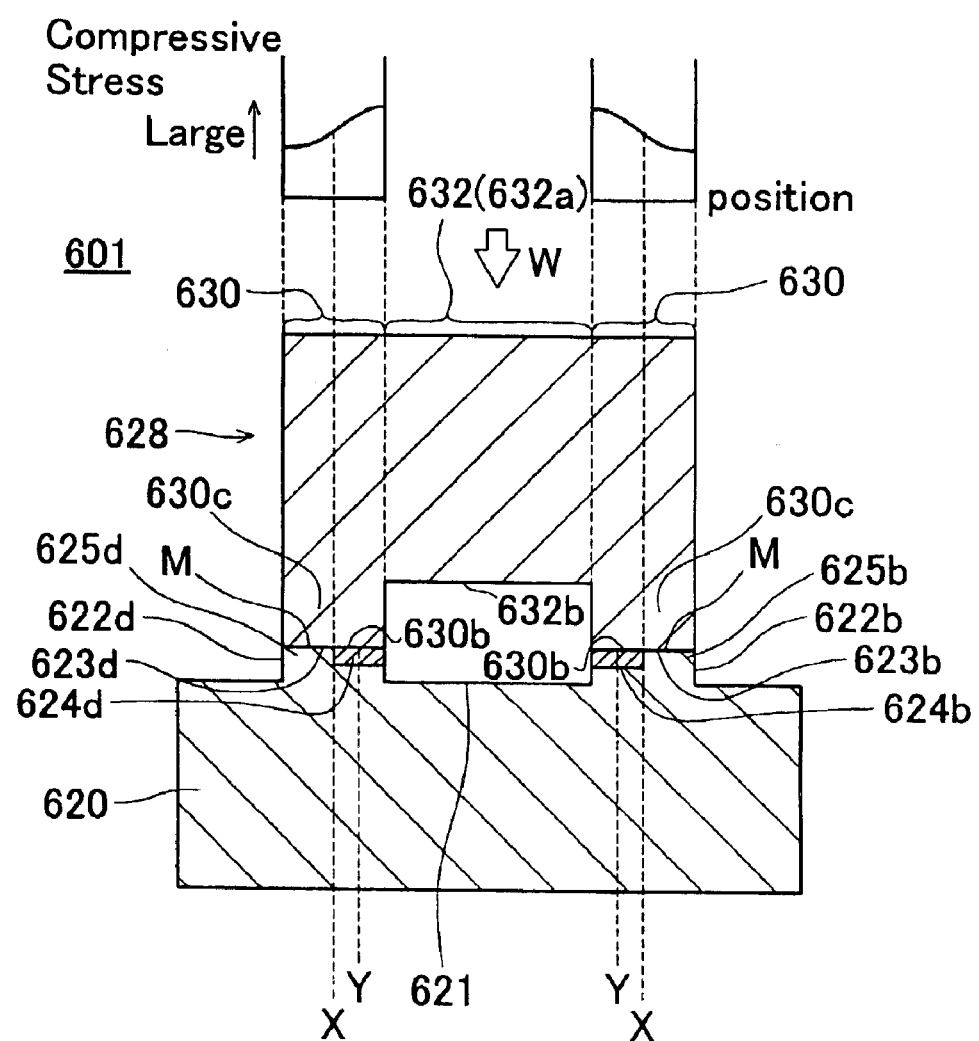
FIG. 14 is a cross sectional view of a sixth representative force detection device.

FIG. 14 shows a cross section of a sixth representative force detection device 601. The cross section shown in FIG. 14 corresponds to the cross section at the site with ridges 422b, 422d of the fourth representative force detection device 401 shown in FIG. 11. It is, however, an expanded cross section that locally emphasizes ridges 622b, 622d and other parts.

Force transmission block 628 shown in FIG. 14 lacks a region corresponding to the non-overlapping region 434, which is defined on the outside of the force transmission block 428 shown in FIG. 11. In other words, a non-overlapping region 632 is present only on one side of the joined surface M when viewed in the direction perpendicular to the joined surface M. Moreover, the bottom surface of the force transmission block 628 has a graded shape rather than a planar shape. Leg 630c projects towards force detection block 620. The bottom surface 632b of the non-overlapping region 632 is formed on an overlapping region 630 of the force transmission block 628.

As shown in FIG. 14, the entire area of ridges 622b, 622d overlaps with the joined surface M when viewed in the direction perpendicular to the joined surface M. As a representative example, strain gages 624b, 624d may be formed only on the inner side portion of ridges 622b, 622d that is closest to non-overlapping region 632 of the force detection block 620. In other words, the center Y of the region where the strain gages 624b, 624d are formed is located nearer to the non-overlapping region 632 than the center X of ridges 622b, 622d. The strain gages 624b, 624d are not required to be formed only on the region of the inside half of ridges 622b, 622d and may extend to the outside beyond the center X of ridges 622b, 622d.

Unlike the fourth representative force detection device 401, the bottom surface 632b of the non-overlapping region 632 of the force transmission block 628 is located at a position that is recessed relative to the joined surface M (bottom surface 630b of the overlapping region 630). Therefore, compressive stress resulting from an external force acting on (or being applied to) surface 632a of the non-overlapping region 632 is dispersed over a wide region even within the region near the non-overlapping region 632. Therefore, compressive stress distribution becomes less concentrated. As a result, a relatively large compressive stress acts on the region inside ridges 622b, 622d. On the other hand, a relatively small compressive stress acts on the region outside ridges 622b, 622d. Therefore, the strain gages 624b, 624d are formed locally in the region of ridges 622b, 622d on which a relatively large compressive stress acts in the sixth representative force detection device 601.

The bottom surface 632b of the non-overlapping region 632 is recessed relative to the bottom surface 630b of the overlapping region 630. Therefore, the bottom surface 632b is prevented from contacting the main surface 621 of the force detection block 620, even if a relatively large external force acts on the top surface of the force transmission block 628 and the bottom surface 632b of the non-overlapping region 632 bends toward the force detection block 620.

Seventh Representative Embodiment

Figure 15:
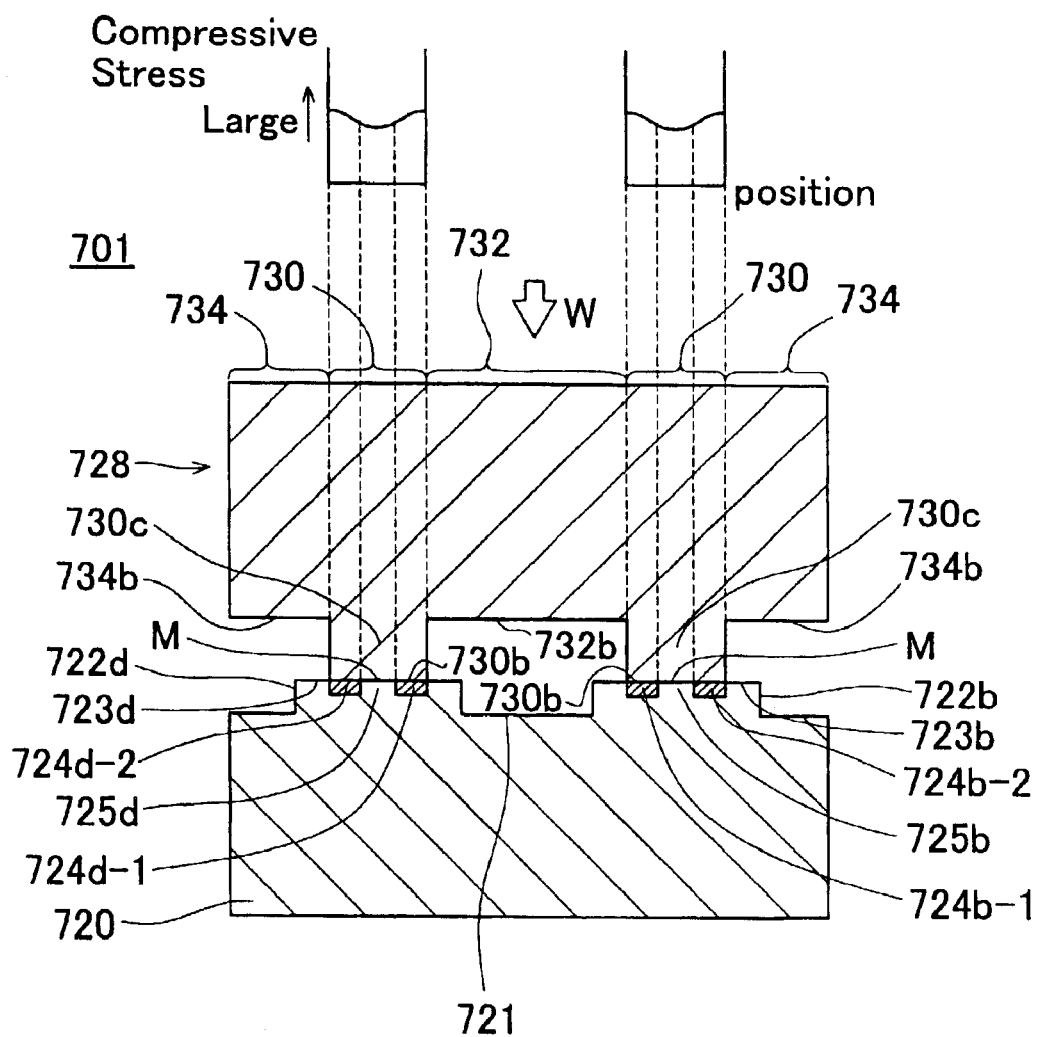
FIG. 15 is a cross sectional view of a seventh representative force detection device.

FIG. 15 is a cross section of a seventh representative force detection device 701, which corresponds to the cross section at the site with ridges 422b, 422d of the fourth representative force detection device 401 shown in FIG. 11.

The bottom surface of force transmission block 728 shown in FIG. 15 preferably has a graded shape rather than a planar shape. Leg 730c projects towards force detection block 720 and opposes non-overlapping regions 732, 734 formed on an overlapping region 730 of the force transmission block 728. The surface area of top surfaces 723b, 723d of ridges 722b, 722d is greater than the surface area of bottom surface 730b of the overlapping region 730. In other words, the surface area of the top surfaces 723b, 723d of ridges 722b, 722d is greater than the surface area of joined surface M. Strain gages 724b-1, 724b-2, 724d-1, 724d-2 may be formed locally in the region overlapping with the joined surface M when viewed in the direction perpendicular to the joined surface M and on both sides of the overlapping region within ridges 722b, 722d.

The intensity of compressive stress distribution is less in the seventh representative force detection device 701 than in the sixth representative embodiment. As a result, a relatively large compressive stress acts on the region overlapping with the joined surface M when viewed in the direction perpendicular to the joined surface M and on both sides of the overlapping region within ridges 722b, 722d. A relatively small compressive stress, on the other hand, acts on the center portion of the overlapping region. Thus, the strain gages 724b, 724d are formed locally in a region of ridges 722b, 722d on which a relatively large compressive stress acts.

According to the seventh representative force detection device 701, the width of ridges 722b, 722d of the force detection block 720 (or the surface area of the top surfaces 723b, 723d) is greater than the width of ridge 730c of the overlapping region 730 of the force transmission block 728 (or the surface area of the bottom surface 730b). Thus, the ridge 722 of the force detection block 720 can support the force transmission block 728 in a stable manner, even if leg 730c is formed on the force transmission block 728.

Eighth Representative Embodiment

Figure 16:
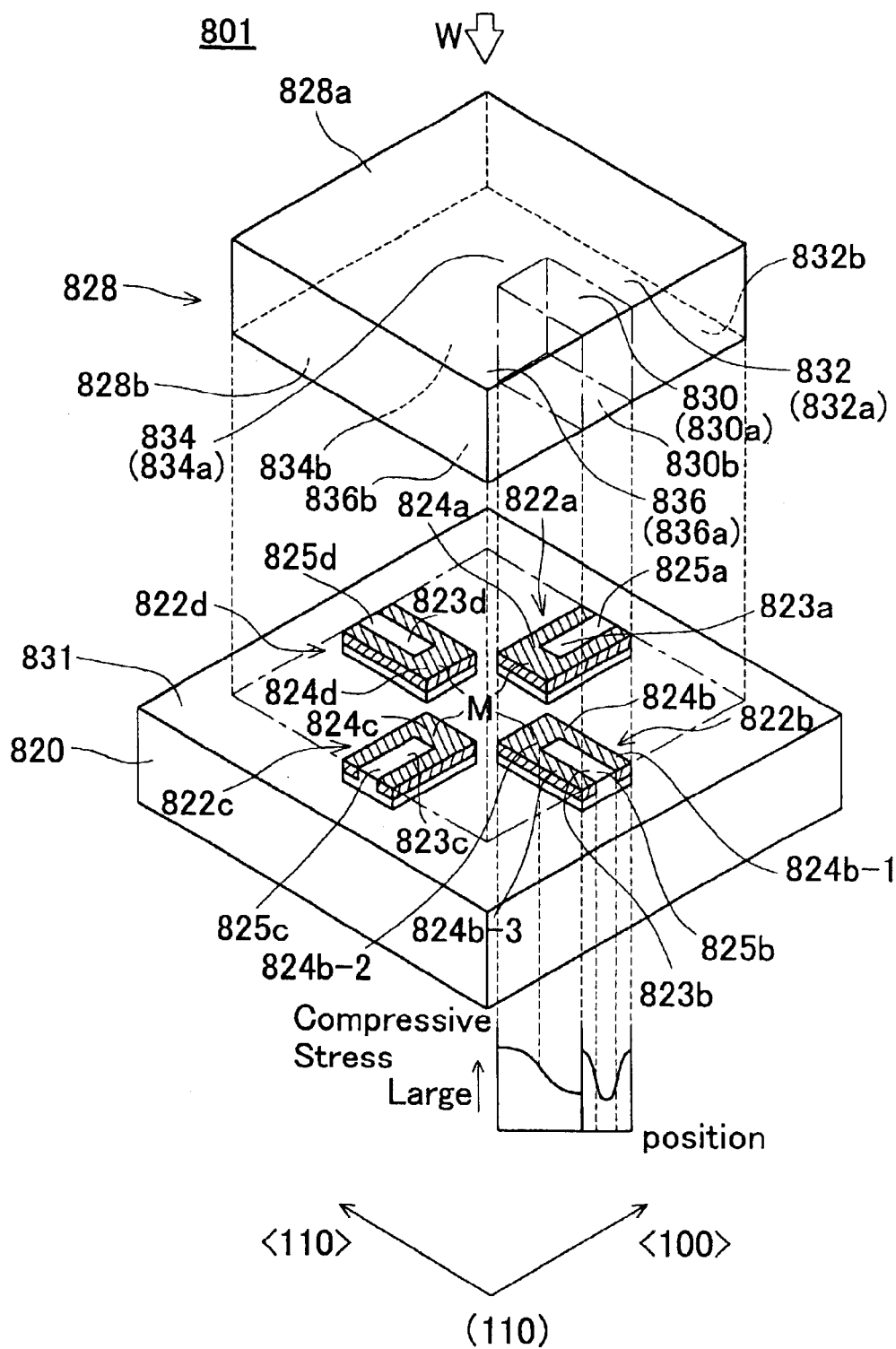
FIG. 16 is a perspective view of an eighth representative force detection device.

FIG. 16 shows a perspective view of an eighth representative force detection device 801, in which four ridges 822a–822d project perpendicularly from the main surface 821 of force detection block 820. Ridges 822a–822d preferably have a rectangular shape when viewed in plan view. Ridges (822a, 822c) and ridges (822b, 822d) are respectively positioned at locations mutually opposed in the lengthwise direction and as a whole are arranged in a cross shape that include a space formed in the middle thereof.

A portion of bottom surface 828b of a force transmission block 828 (e.g., the bottom surface 830b of overlapping region 830, which will be discussed below) is securely joined to top surfaces 823a–823d of ridges 822a–822d, e.g., by electrostatic bonding. Thus, the top surfaces 823a–823d collectively define the joined surface M.

The force transmission block 828 includes an overlapping region 830 in a location overlapping with the joined surface M when viewed in the direction perpendicular to the joined surface M. Further, first, second and third non-overlapping regions 832, 834, 836 are defined in non-overlapping locations. For the sake of clarity, only the overlapping region 830, which overlaps with ridge 822b in the force transmission block 828, is shown in FIG. 16, but regions overlapping with ridges 822a, 822c, and 822d are also present. Surfaces 830a, 832a, 834a, 836a are parallel to the joined surface M and are formed respectively on the overlapping region 830 and the first, second and third non-overlapping regions 832, 834, 836. The surfaces 830a, 832a, 834a, 836a include top surface 828a of the force transmission block 828.

The bottom surface 828b of the force transmission block 828 may be entirely planar. The bottom surface 828b may be defined by bottom surface 830b of the overlapping region 830 and bottom surfaces 832b, 834b, and 836b of the first, second and third non-overlapping regions 832, 834, 836.

Still referring to FIG. 16, the non-overlapping regions 832, 836 may be defined on both sides of ridge 822b in the widthwise direction when viewed in the direction perpendicular to the joined surface M. The non-overlapping region 834 is defined on one side in the lengthwise direction of ridge 822b. Further, strain gages 824b-1, 824b-3 are formed in the side portion of ridge 822b and correspond to the non-overlapping regions 832, 836. However, strain gage 824b-2 is formed in the side portion of ridge 822b and corresponds to the non-overlapping regions 834. The strain gages 824b-1 to 824b-3 are formed as a whole on a C-shaped region when viewed in the direction perpendicular to the joined surface M. Thus, the eighth representative embodiment basically combines the teachings the fourth and sixth representative embodiments.

As the illustration of compressive stress distribution shows in FIG. 16, compressive stress acts more on the first, second and third side portions 824b-1 to 824b-3 of ridge 822b than it does on middle portion 825b. In the eighth representative embodiment, the strain gages 824a–824d are locally formed in the C-shaped region when viewed in the direction perpendicular to the joined surface M of ridges 822a–822d on which a large compressive stress acts. The four strain gages 824a–824d preferably constitute a Wheatstone bridge.

Representative modifications of the seventh and eighth representative embodiments include locally forming the strain gage in the middle portion widthwise of the overlapping region of ridge (e.g., the site of reference symbol 725 in the seventh representative embodiment (FIG. 15) and the site of reference symbol 825 in the eighth representative embodiment (FIG. 16). Thus, similar to the fifth representative embodiment, fluctuations in the amount of resistance change in the strain gage (detection sensitivity) among a plurality of force detection devices that form the strain gage can be decreased.

Ninth Representative Embodiment

Figure 17:
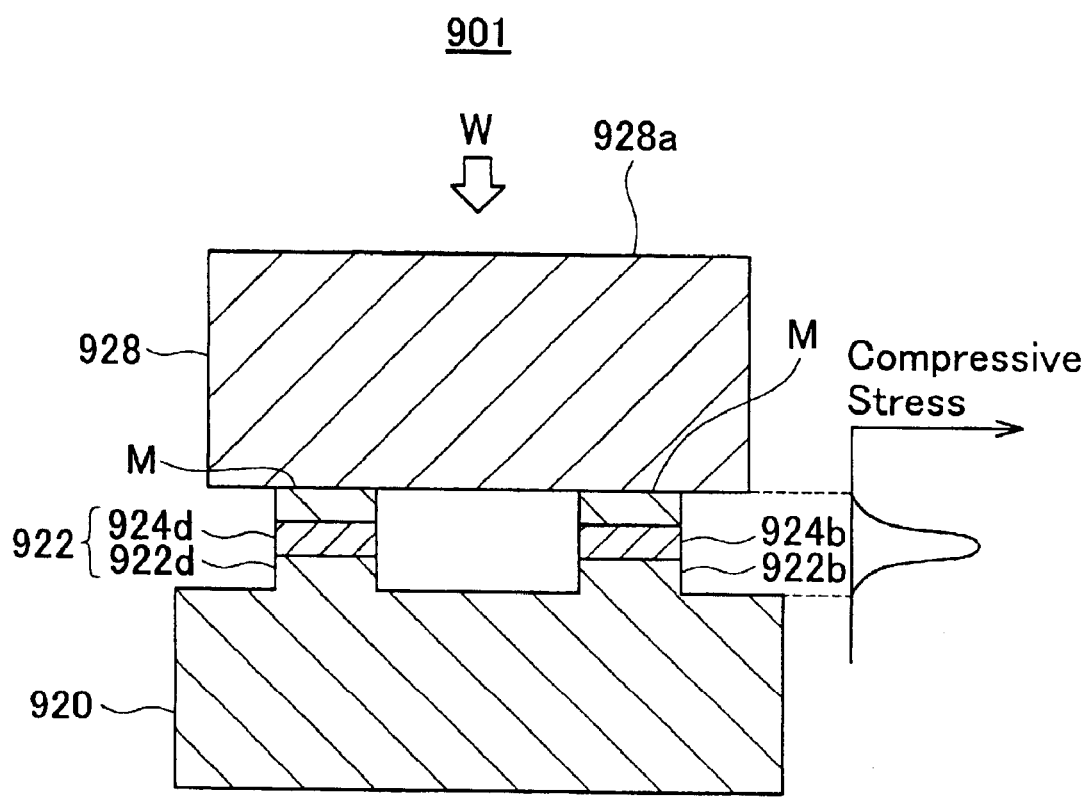
FIG. 17 is a cross sectional view of a ninth representative force detection device.

FIG. 17 is a cross section of a ninth representative force detection device 901, which corresponds to the cross section at the site with ridges 422b, 422d of the fourth representative force detection device 401 shown in FIG. 11.

As shown in FIG. 17, strain gages 924b, 924d are formed locally at the middle portion in the height direction of ridges 922b, 922d of force detection block 920. A part of the bottom surface of force transmission block 928 is securely attached to the top surface of ridge 922 by electrostatic bonding. The entire top surface defines a joined surface M.

Because the force transmission block 928 is attached to ridge 922 of the force detection block 920, a greater compressive stress acts on the middle portion in the height direction of height of ridge 922 than on the top or bottom portion. (See compressive stress distribution in FIG. 17.) Therefore, by forming the strain gages 924b, 924d locally at the middle portion in the height direction ridges 922b, 922d, greater compressive stress may act on the strain gage 924 than when the strain gage is formed on the top portion of the ridge 922. Force detection device 901 may have relatively high detection sensitivity with a large amount of resistance change within the strain gage 924.

Figure 18:
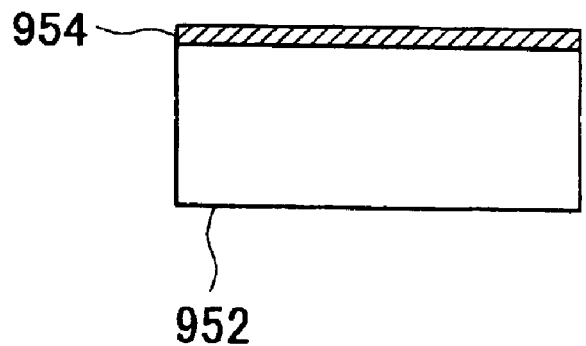
FIG. 18 illustrates a first step of a first representative method for manufacturing the ninth representative force detection device.
Figure 19:
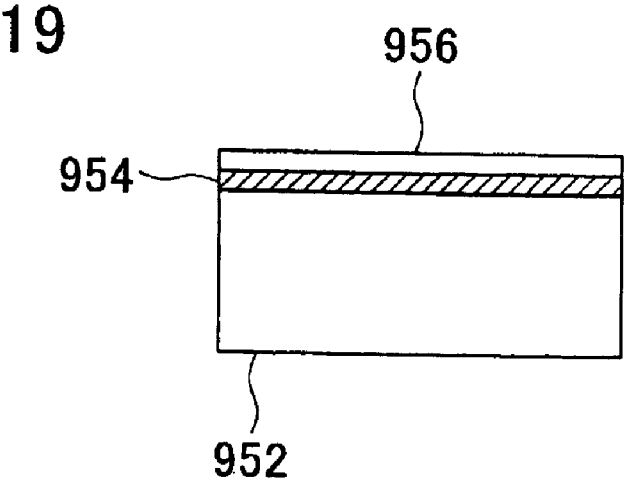
FIG. 19 illustrates a second step of the first representative method for manufacturing the ninth representative force detection device.
Figure 20:
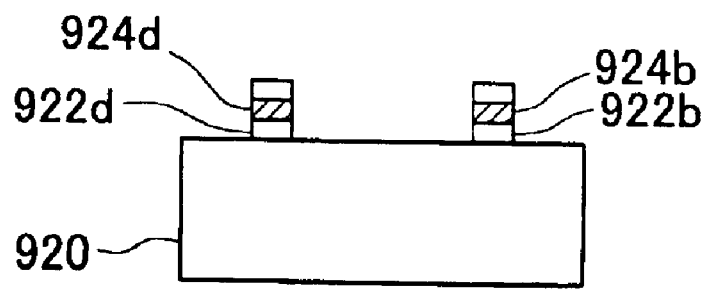
FIG. 20 illustrates a third step of the first representative method for manufacturing the ninth representative force detection device.

A first representative method for manufacturing the ninth representative force detection device 901 will now be described. As shown in FIG. 18, a p-type dopant is implanted in the top surface of an n-type silicon substrate 952 using ion implantation or another method to form a high-density p-type diffused layer 954. As shown in FIG. 19, an epitaxial layer 956 (i.e., a thin silicon film) then is formed over the p-type diffused layer 954 using an epitaxial growth method. As shown in FIG. 20, the portion that will define ridges 922b, 922d are masked and the top portions of the epitaxial layer 956, the p-type diffused layer 954, and the silicon substrate 952, located deeper than the p-type diffused layer 954 in FIG. 19 are etched using reactive ion etching (RIE) or another such technique. As a result, ridges 922b, 922d are formed and the strain gages 924b; 924d are formed in the middle portion in the height direction. Referring back to FIG. 17, the top surface of ridge 922 of the force detection block 920 may be electrostatically bonded to the bottom surface of the force transmission block 928, thereby forming the force detection device 901.

Figure 21:
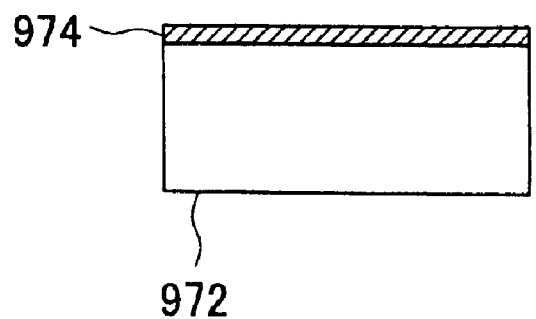
FIG. 21 illustrates a first step of a second representative method for manufacturing the ninth representative force detection device.
Figure 22:
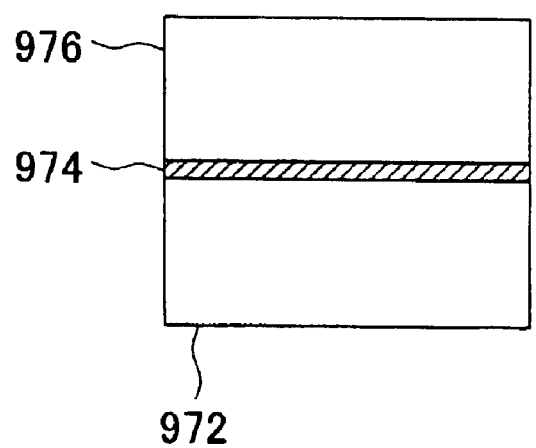
FIG. 22 illustrates a second step of the second representative method for manufacturing the ninth representative force detection device.
Figure 23:
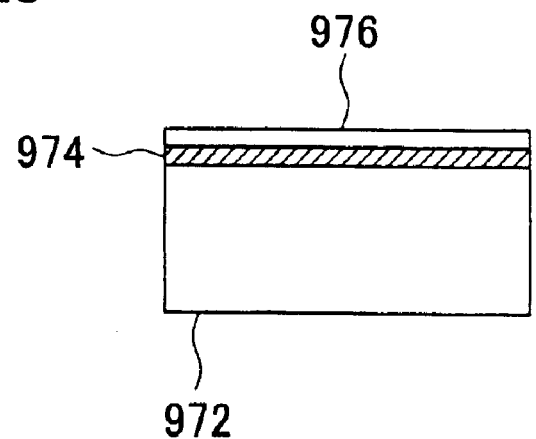
FIG. 23 illustrates a third step of the second representative method for manufacturing the ninth representative force detection device.

A second representative method for manufacturing the ninth representative force detection device 901 will now be described. As shown in FIG. 21, a high-density p-type diffused layer 954 is formed on the front surface of a first n-type silicon substrate 972, as in the first manufacturing method. As shown in FIG. 22, a second n-type silicon substrate 976 is then joined to the first n-type silicon substrate 972. As shown in FIG. 23, the top surface of substrate 976 is ground until the second n-type silicon substrate 976 becomes a thin, plate-like shape. This configuration is similar to the configuration shown in FIG. 19. Thereafter, the manufacturing steps discussed with reference to FIG. 20 may be utilized to complete the manufacture of the force detection device 901.

As a third representative method for manufacturing the ninth representative force detection device 901, a p-type dopant may be implanted locally only to a location somewhat below the top surface of the n-type silicon substrate using ion implantation or another method to form the device shown in FIG. 11. Again, manufacturing steps similar to those of the first manufacturing method may be executed (e.g., see the description concerning FIG. 20) in order to complete the manufacture of the force detection device 901.

Tenth Representative Embodiment

Figure 24:
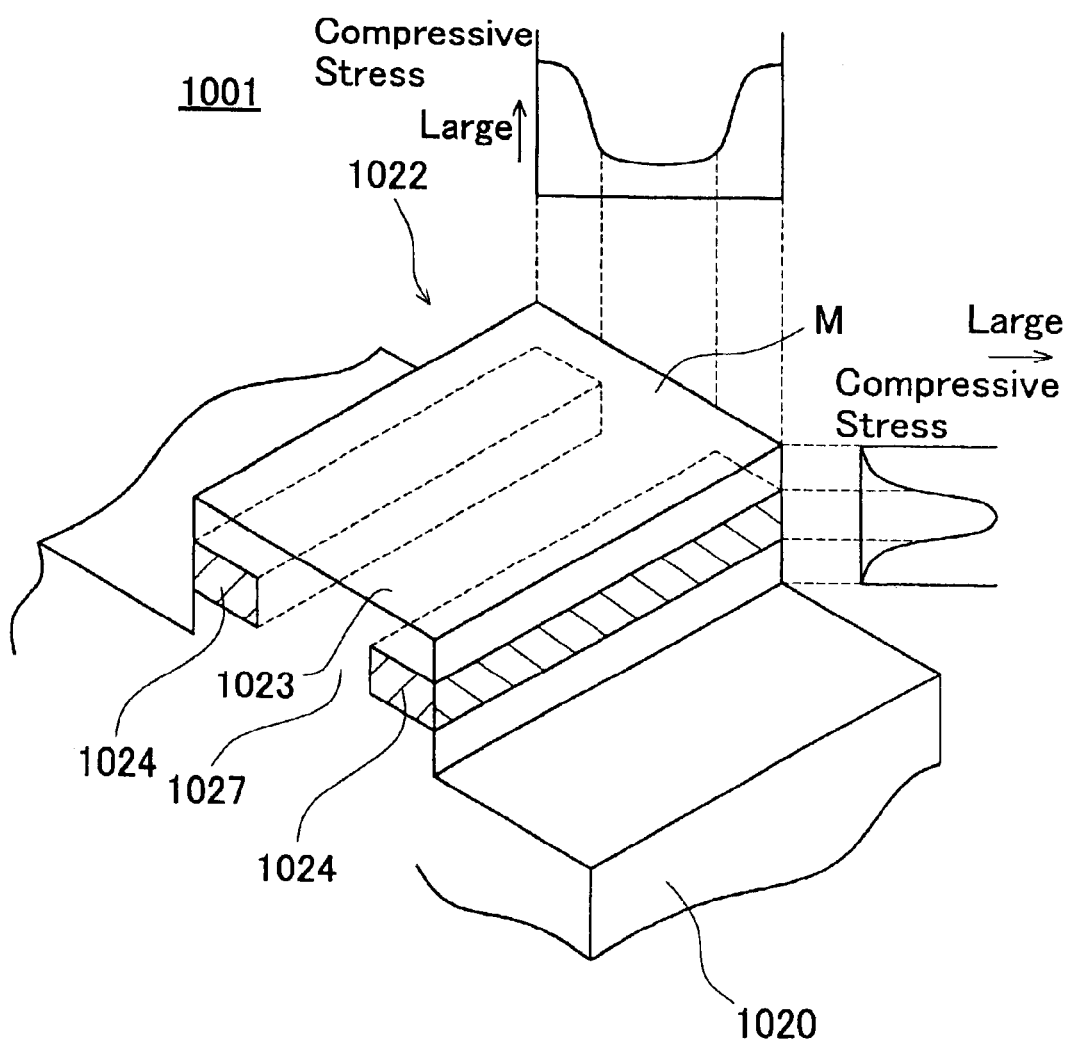
FIG. 24 shows a perspective view of the ridge of a tenth representative force detection device.

FIG. 24 is a perspective view of a ridge 1022 of a tenth representative force detection device 1001, which corresponds to the expanded perspective view of ridge 422b of the fourth representative force detection device 401 shown in FIG. 11. The tenth representative force detection device 1001 may be substantially a combination of the fourth and ninth representative embodiments.

Ridge 1022 may include strain gages 1024, which may be defined as p-type diffused regions formed locally in the middle portion with respect the height direction and on both side portions in an n-type semiconductor layer 1027. The bottom surface of a force transmission block (not shown in drawing) similar to the force transmission block 428 of the fourth embodiment may be electrostatically bonded to top surface 1023 of ridge 1022 of force detection block 1020. Further, the entire surface of the top surface 1023 may define a joined surface M.

Similar to the fourth representative embodiment, a larger compressive stress acts on the side portion of ridge 1022 than on the middle portion of ridge 1022. If the force transmission block is affixed to the top surface 1023 of ridge 1022 of the force detection block 1020, a larger compressive stress acts on the side portion in the height direction of ridge 1022 than does so on the top or bottom portion of ridge 1022, as was noted in the description of the ninth representative embodiment. Therefore, if the strain gages 1024 are formed locally at the middle portion in the height direction of ridge 1022 and on both side portions thereof, an even greater compressive stress acts on each strain gage 1024. Thus, force detection device 1001 may exhibit higher detection sensitivity by using a strain gage 1024 that provides larger resistance changes.

Eleventh Representative Embodiment

Figure 25:
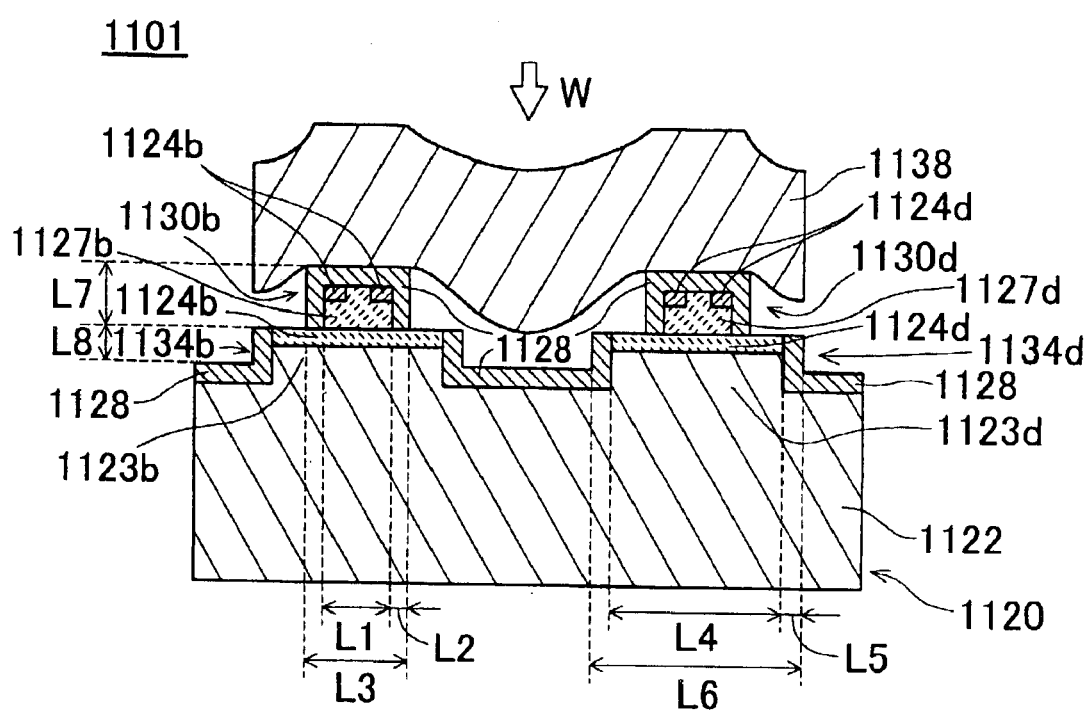
FIG. 25 is a cross sectional view of an eleventh representative force detection device.

In the first representative force detection device 101 shown in FIG. 1, the entirety of the first semiconductor layer 126 constituting the narrow ridge 130 defined the strain gage. However, the eleventh representative force detection device 1101 shown in FIG. 25 includes strain gages 1124b, 1124d that are p-type regions, which are locally formed on both side portions widthwise of the top portion of the n-type semiconductor layers 1127b, 1127d constituting ridges 1130b, 1130d. Thus, the eleventh representative embodiment is basically a combination of the first and fourth representative embodiments.

The current flowing through the strain gages 1124b, 1124d is more reliably prevented from leaking to the outside due to the separated p-n junction construction of a first insulating layer 1124b, a second insulation layer 1128, an n-type semiconductor layer 127, and the strain gage 1124 that is defined as a p-type region. Thus, force detection device 1101 may exhibit higher detection sensitivity. Moreover, the strain gages 1124b, 1124d are locally formed in a region of ridge 1130 on which a large amount of stress acts. Therefore, force detection device 1101 includes strain gages 1124b, 1124d that undergo large resistance changes.

Twelfth Representative Embodiment

Figure 26:
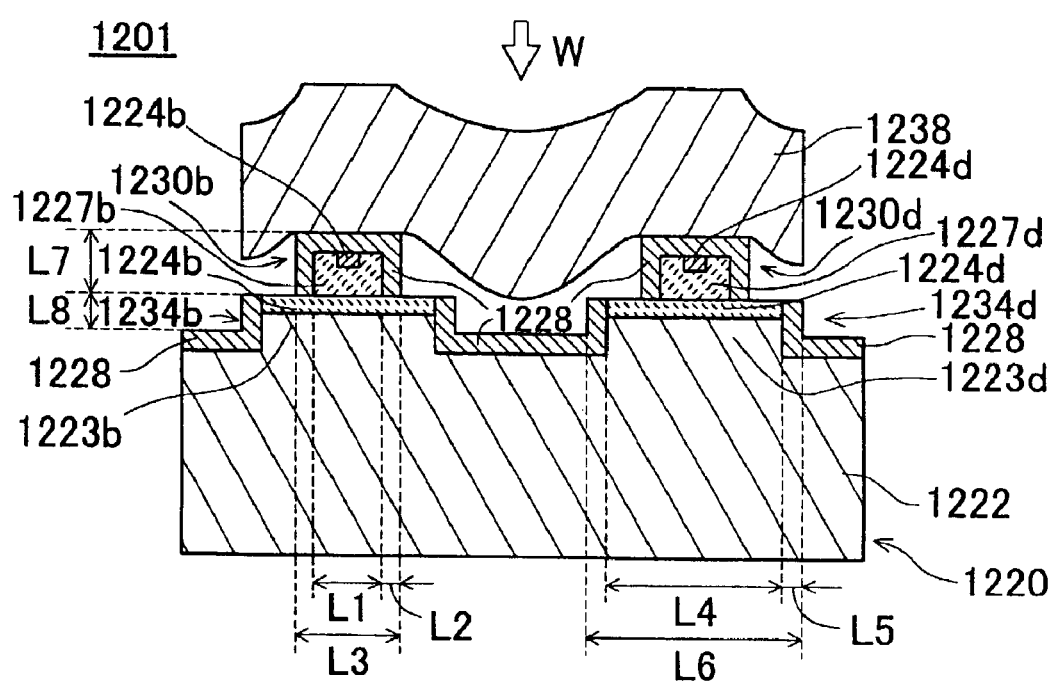
FIG. 26 is a cross sectional view of a twelfth representative force detection device.

In the twelfth representative force detection device 1201 shown in FIG. 26, strain gages 1224b, 1224d are locally formed on the middle portions widthwise of n-type semiconductor layers 1227b, 1227d that constitute ridges 1230b, 1230d. Thus, the twelfth representative embodiment is basically a combination of the first and fifth representative embodiments. The twelfth representative embodiment also provides a force detection device exhibiting high detection accuracy and small fluctuations in sensitivity among a plurality of force detection devices.

Thirteenth Representative Embodiment

Figure 27:
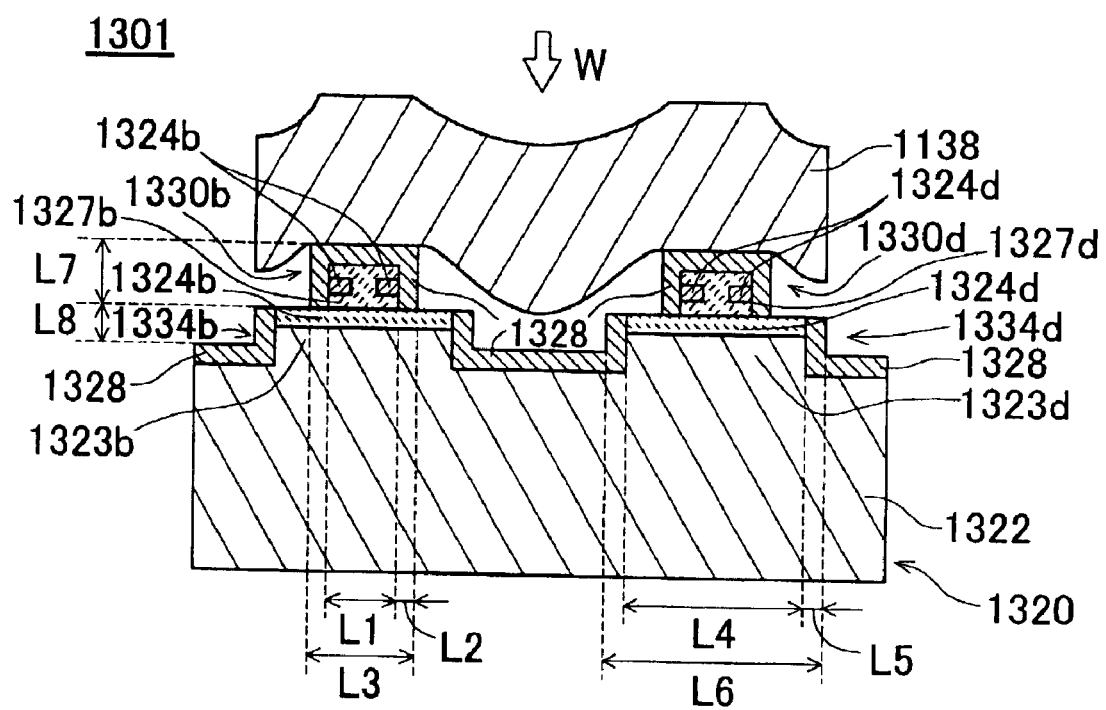
FIG. 27 is a cross sectional view of a thirteenth representative force detection device.

In the thirteenth representative force detection device 1301 shown in FIG. 27, strain gages 1324b, 1324d are locally formed on the middle portions in the height direction of n-type semiconductor layers 1327b, 1327d that constitute ridges 1330b, 1330d. The top surfaces of ridges 1330b, 1330d of force detection block 1322 are electrostatically bonded to the bottom surface of a force transmission block 1338. The thirteenth representative embodiment is basically a combination of the first and tenth representative embodiments, which provides a force detection device 1301 having high detection accuracy and high detection sensitivity.

The scope of the invention is not limited by the crystal surface, the crystal direction or bridge constructions that were described above. For example, other crystal surfaces or crystal directions may be advantageously used with the present teachings instead of the (110) surface, the <110> direction, or the <100> direction. The (100) direction, for example, could also be used as the crystal surface. If the (100) surface is used, the resistance change in the strain gage may be relatively large and integration would be simplified. Moreover, a simple gauge construction may be used instead of a Wheatstone bridge. If the (110) surface, the <110> direction, and the <100> direction are used, crystal surfaces or crystal directions equivalent thereto may be used. Crystal surfaces and directions equivalent thereto are listed in Tables 1–3 of Japanese Laid-open Patent Publication No. 2001-304997.

There are no particular limits on the shape of the ridges. For example, the top surface of the ridge may be slanted or inclined relative to the main surface of the force detection block. In the alternative, the top surface of the ridge may be curved. The side of the ridge also may have, e.g., a tapered shape with a wide end. Although the ridges of the representative embodiments were generally rectangular shaped, the ridges may also have a graded shape. For example, in the fourth representative force detection device 401 shown in FIG. 9, the four ridges 422a–422d were arranged in the shape of a square. However, the four ridges 422a–422d also may be arranged in a diamond shape, or a curved, extending ridge could be arranged as a circular shape. In addition, the force transmission block could be supported in a stable manner by providing two or more long, narrow ridges.

The scope of the invention is not limited to the contact surface of ridges of the force detection block and the force transmission block and the surface of external force action of the force transmission block being parallel. The contact surface and the surface of external force action could, for example, be perpendicular so that the bending moment from an external force acting on the surface of external force action would cause compressive stress to act on the contact surface. Moreover, the stress acting on the contact surface of ridge need not be compressive stress. That is, the present teachings are also applicable if tensile stress or both compressive stress and tensile stress are used.

What is claimed is:

1. An apparatus for measuring a force comprising:
   a substrate;
   a first insulating layer covering at least a portion of a top surface of the substrate;
   a ridge extending along a top surface of the first insulating layer;
   a strain gage enclosed within said ridge, the strain gage comprising a semiconductor material having a resistance that changes in response to stress applied to the semiconductor material; and
   a force transmission block contacting a top surface of the ridge, wherein the first insulating layer has a width that is greater than the width of the strain gage, and
   a portion of the first insulating layer which is directly below said strain gage is in direct contact with the substrate.

2. An apparatus as in claim 1, wherein
   a cross-sectional area of the ridge is smaller than a cross-sectional area of the substrate and the cross-sectional area of the ridge is also smaller than a cross-sectional area of the force transmission block.

3. An apparatus as in claim 2, wherein a top surface of the substrate defines a base, the ridge is formed along a top surface of the base, the base has a width that is wider than the width of the ridge, and the top surface of the base is covered with the first insulating layer.

4. An apparatus as in claim 2, further comprising a second insulating layer covering the top and side faces of the ridge.

5. An apparatus as in claim 4, wherein second insulating layer also covers a top surface of the substrate at a position other than the base.

6. An apparatus as in claim 1, wherein the substrate comprises a silicon-on-insulator (SOI) substrate, the first insulating layer is an insulating layer for silicon-on-insulator (SOI) substrate, and the strain gage comprises an active semiconductor layer of silicon-on-insulator (SOI) substrate.

7. An apparatus as in claim 2, further comprising a leg extending from a bottom surface of the force transmission block, wherein the top surface of the ridge contacts a bottom surface of the leg.

8. An apparatus as in claim 1, further comprising a pair of electrodes and the strain gage is formed between the pair of electrodes within the ridge, which extends between the pair of electrodes along the top surface of the first insulating layer.

9. An apparatus as in claim 8, further comprising a second ridge for supporting the force transmission block, the second ridge having no strain gage therein.

10. An apparatus for measuring a force comprising:
    a substrate having a top surface;
    a first insulating layer covering at least a portion of said top surface of the substrate, said first insulating layer having a top surface;
    a ridge extending along said top surface of the first insulating layer, said ridge having a top surface;
    a strain gage enclosed within said ridge, the strain gage comprising a semiconductor material having a resistance that changes in response to stress applied to the semiconductor material; and
    a force transmission block having a bottom surface contacting said top surface of the ridge, wherein
    the first insulating layer has a width that is greater than the width of the strain gage, and
    a recess is formed at either the top surface of the substrate or the bottom surface of the force transmission block, said recess configured to prevent the substrate and the force transmission block from making contact at places other than the top surface of the ridge.

* * * * *